US012303827B2

(12) United States Patent
Khan et al.

(10) Patent No.: US 12,303,827 B2
(45) Date of Patent: May 20, 2025

(54) FOOD WASTE DISPOSER

(71) Applicant: SAMSUNG ELECTRONICS CO., LTD., Suwon-si (KR)

(72) Inventors: Qasim Khan, Suwon-si (KR); Myoungkeun Kwon, Suwon-si (KR); Sangjin Kim, Suwon-si (KR); Eungryeol Seo, Suwon-si (KR); Changhoon Oh, Suwon-si (KR); Sangjin Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 175 days.

(21) Appl. No.: 17/894,710

(22) Filed: Aug. 24, 2022

(65) Prior Publication Data
US 2023/0129640 A1 Apr. 27, 2023

Related U.S. Application Data

(63) Continuation of application No. PCT/KR2022/010980, filed on Jul. 26, 2022.

(30) Foreign Application Priority Data

Oct. 26, 2021 (KR) .................. 10-2021-0143780
Dec. 20, 2021 (KR) .................. 10-2021-0182618

(51) Int. Cl.
*B01D 5/00* (2006.01)
*B01D 46/00* (2022.01)
(Continued)

(52) U.S. Cl.
CPC ......... *B01D 53/265* (2013.01); *B01D 5/0015* (2013.01); *B01D 5/009* (2013.01);
(Continued)

(58) Field of Classification Search
CPC .. B01D 5/0015; B01D 5/009; B01D 46/0038; B01D 53/007; B01D 53/265; B01D 53/88; B65F 1/14
See application file for complete search history.

(56) References Cited

U.S. PATENT DOCUMENTS 5,980,823 A * 11/1999 Nekozuka ............... A61L 9/16
422/4
7,845,586 B2 * 12/2010 Lee ....................... B02C 23/00
241/101.8
(Continued)

FOREIGN PATENT DOCUMENTS

CZ           305 015       3/2015
JP           8-121961      5/1996
(Continued)

OTHER PUBLICATIONS

Espacenet Machine Translation of KR100763401B obtained Aug. 22, 2024. (Year: 2024).*
(Continued)

*Primary Examiner* — Jonathan Miller
(74) *Attorney, Agent, or Firm* — STAAS & HALSEY LLP

(57) ABSTRACT

A food waste disposer including a housing, a container disposed inside the housing and provided to accommodate food waste, an exhaust duct communicating with the container and provided to allow exhaust gas generated in the container to flow therein, a filter device including a catalytic filter part configured to filter the exhaust gas passed through the exhaust duct, and a deodorizing filter part configured to filter the exhaust gas passed through the catalytic filter part and communicating with an outside of the housing, and a condensation chamber configured to remove moisture in the exhaust gas flowing from the exhaust duct into the catalytic filter part of the filter device.

14 Claims, 23 Drawing Sheets

(51) Int. Cl.
  *B01D 53/00*  (2006.01)
  *B01D 53/26*  (2006.01)
  *B01D 53/88*  (2006.01)
  *B65F 1/14*  (2006.01)
  *B02C 18/00*  (2006.01)
  *B02C 18/16*  (2006.01)

(52) U.S. Cl.
  CPC ....... *B01D 46/0038* (2013.01); *B01D 53/007* (2013.01); *B01D 53/88* (2013.01); *B65F 1/14* (2013.01); *B01D 2255/802* (2013.01); *B01D 2273/30* (2013.01); *B02C 18/0092* (2013.01); *B02C 18/16* (2013.01); *B65F 2210/137* (2013.01)

(56) References Cited

U.S. PATENT DOCUMENTS

| | | | |
|---|---|---|---|
| 8,378,265 | B2 | 2/2013 | Greenwood et al. |
| 9,074,776 | B2 | 7/2015 | Greenwood et al. |
| 10,702,816 | B2 | 7/2020 | Suda |
| 2023/0173503 | A1 | 6/2023 | Kim |

FOREIGN PATENT DOCUMENTS

| | | | | |
|---|---|---|---|---|
| JP | 2000-93933 | | 4/2000 | |
| JP | 2004-82001 | | 3/2004 | |
| KR | 20-0144043 | Y1 | 6/1999 | |
| KR | 20-0183875 | Y1 | 6/2000 | |
| KR | 2003-0009814 | | 2/2003 | |
| KR | 10-0722714 | B1 | 5/2007 | |
| KR | 10-0734423 | | 7/2007 | |
| KR | 10-0763401 | | 10/2007 | |
| KR | 20-0437625 | Y1 | 12/2007 | |
| KR | 10-2011-0076013 | | 7/2011 | |
| KR | 10-2012-0018732 | | 3/2012 | |
| KR | 10-2012-0032956 | | 4/2012 | |
| KR | 10-1138500 | B1 | 4/2012 | |
| KR | 10-1197233 | | 11/2012 | |
| KR | 101229156 | B1 * | 2/2013 | ............... B01D 5/00 |
| KR | 10-1649691 | B1 | 8/2016 | |
| KR | 10-1724385 | B1 | 4/2017 | |
| KR | 10-2021-0103148 | | 8/2021 | |
| KR | 10-2021-0120454 | | 10/2021 | |

OTHER PUBLICATIONS

Espacenet Machine Translation of KR101229156B obtained Aug. 22, 2024. (Year: 2024).*
Espacenet Machine Translation of KR20110076013A obtained Aug. 20, 2024. (Year: 2024).*
International Search Report dated Nov. 16, 2022 issued in PCT Application No. PCT/KR2022/010980.
Written Opinion dated Nov. 16, 2022 issued in PCT Application No. PCT/KR2022/010980.
Supplementary European Search Report dated Dec. 6, 2024 issued in European Application No. EP 22 88 7300.

* cited by examiner

FOOD WASTE DISPOSER

CROSS-REFERENCE TO RELATED APPLICATION

This application is a continuation application, under 35 U.S.C. § 111(a), of international application No. PCT/KR2022/010980, filed on Jul. 26, 2022, which claims priority under 35 U.S.C. § 119(e) to Korean Provisional Application No. 10-2021-0143780, filed on Oct. 26, 2021, and under 35 U.S.C. § 119 to Korean Patent Application No. 10-2021-0182618 filed on Dec. 20, 2021, the disclosures of which are incorporated herein by reference in its entirety.

BACKGROUND

1. Field

The disclosure relates to a food waste disposer having an improved structure.

2. Description of the Related Art

In general, a food waste disposer is an apparatus for disposing of food waste by drying, grinding, microbial fermentation, or the like.

As an example, the food waste disposer may include a grinding device for stirring and grinding food waste. The food waste disposer may include a heat generating device that applies heat to the grinding device such that the food waste inside the grinding device is dried.

As an example, the food waste disposer may include a filter device for filtering exhaust gas generated during disposal of food waste. The filter device may include a deodorizing filter to remove or neutralize the odor of the exhaust gas. However, since the deodorizing filter becomes saturated when adsorbing odors, periodic replacement is required. Accordingly, the food waste disposer may further include a catalytic filter to use the deodorizing filter for a longer period of time and to filter the exhaust gas more effectively. However, when the moisture content of the exhaust gas is high, the performance of the catalytic filter may become lowered.

SUMMARY

Therefore, it is an object of the disclosure to provide a food waste disposer with improved ease of use.

It is another object of the disclosure to provide a food waste disposer that prevents deterioration of the performance of a filter device by removing moisture from exhaust gas flowing into a catalytic filter.

It is another object of the disclosure to provide a food waste disposer capable of reducing a flow loss of exhaust gas during removal of moisture from the exhaust gas.

It is another object of the disclosure to provide a food waste disposer capable of effectively draining condensed water.

The technical objectives of the disclosure are not limited to the above, and other objectives may become apparent to those of ordinary skill in the art based on the following descriptions.

According to an aspect of the disclosure, there is provided a food waste disposer including: a housing; a container disposed inside the housing to accommodate food waste; an exhaust duct communicating with the container to allow exhaust gas generated in the container to flow therein; a filter device including a catalytic filter part configured to filter the exhaust gas passed through the exhaust duct, and a deodorizing filter part configured to filter the exhaust gas passed through the catalytic filter part and communicating with an outside of the housing; and a condensation chamber configured to remove moisture in the exhaust gas flowing from the exhaust duct into the catalytic filter part of the filter device, the condensation chamber including a condensation passage formed by extending in one direction to allow the exhaust gas to flow therethrough and a baffle plate provided in the condensation passage to obstruct a flow of the exhaust gas.

The baffle plate of the condensation chamber may include a plurality of through holes which the exhaust gas passes through.

The food waste disposer may further include a drain tray disposed at a lower side of the condensation chamber in the housing to collect condensed water generated in the condensation chamber.

The baffle plate may extend along the condensation passage, and the plurality of through holes may be arranged along the condensation passage.

The one direction may be a first direction, and the baffle plate may be disposed in a second direction crossing the first direction to block the condensation passage.

The baffle plate may include a plurality of baffle plates, and the plurality of baffle plates may be spaced apart from each other.

The condensation chamber may include: a chamber body forming the condensation passage therein; an inlet provided at one side of the chamber body, and communicating with the exhaust duct to introduce the exhaust gas from the exhaust duct into the condensation passage; and an outlet provided at an other side of the chamber body, and communicating with the drain tray to discharge the exhaust gas passed through the condensation passage to the drain tray.

The inlet may be formed in an upper portion of the chamber body, and the outlet is formed in a lower portion of the chamber body.

The drain tray may communicate with each of the condensation chamber and the catalyst filter part, and the exhaust gas passed through the condensation chamber may flow to the catalytic filter part through the drain tray.

The drain tray may further include: a drain hole through which the condensed water collected from the condensation chamber is drained; and a bottom surface part configured to form a recess for accommodating the condensed water collected from the condensation chamber, and provided to be inclined downward toward the drain hole.

The drain tray may comprise a drain hole formed therein, and the food waste disposer further comprises a drain pipe connected to the drain hole to discharge the condensed water drained from the drain hole to the outside of the housing.

The food waste disposer may further include an exhaust fan to communicate with the exhaust duct to form an intake airflow from the container toward the filter device.

The catalytic filter part may include: a filter case to accommodate a catalytic filter therein, and a light emitting member provided in the filter case to face the catalytic filter and to irradiate the catalytic filter when the catalytic filter is in accommodated in the filter case.

The filter case may include a case hole formed through the filter case to lower a temperature of the filter case by releasing heat generated by the light emitting member through the case hole.

The condensation chamber may further include a reinforcing member provided on an inner wall of the chamber body to reinforce a rigidity of the chamber body.

According to an aspect of the disclosure, there is provided a food waste disposer including: a housing; a grinding device including a grinding case having a upper portion that is open to receive food waste therethrough and a rotating grinder detachably mounted to an inside of the grinding case to grind the received food waste; a support frame configured to support an upper portion of the grinding device inside the housing; a cover rotatably coupled to one side of the support frame to open or close the grinding case; an exhaust duct configured to, in response to closing the grinding case by the cover, to communicate with the grinding case to allow exhaust gas generated in the griding case to flow therein; a condensation chamber configured to heat-exchange with the exhaust gas introduced from the exhaust duct, the condensation chamber including a baffle plate including a plurality of through holes to reduce a flow loss of the exhaust gas; a drain tray disposed at a lower side of the condensation chamber to accommodate condensed water generated from the condensation chamber; and a filter device configured to filter the exhaust gas having moisture removed through the heat exchange in the condensation chamber and discharge the filtered exhaust gas to an outside of the housing.

The filter device includes a photocatalytic filter configured to filter the exhaust gas passed through the condensation chamber and a deodorizing filter configured to filter the exhaust gas passed through the photocatalytic filter and communicating with the outside of the housing.

The condensation chamber may include a condensation passage formed therein, and through which the exhaust gas flows, and the baffle plate may be provided to divide the condensation passage from the drain tray.

The condensation chamber may include a condensation passage formed therein, and through which the exhaust gas flows, and the baffle plate may be provided to partition at least a portion of the condensation passage.

The food waste disposer may further include a service opening formed in a rear side of the housing corresponding to the drain tray such that the drain tray is accessible from the outside of the housing, and a service cover detachably mounted on the rear side of the housing to cover the service opening.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Figure 1:
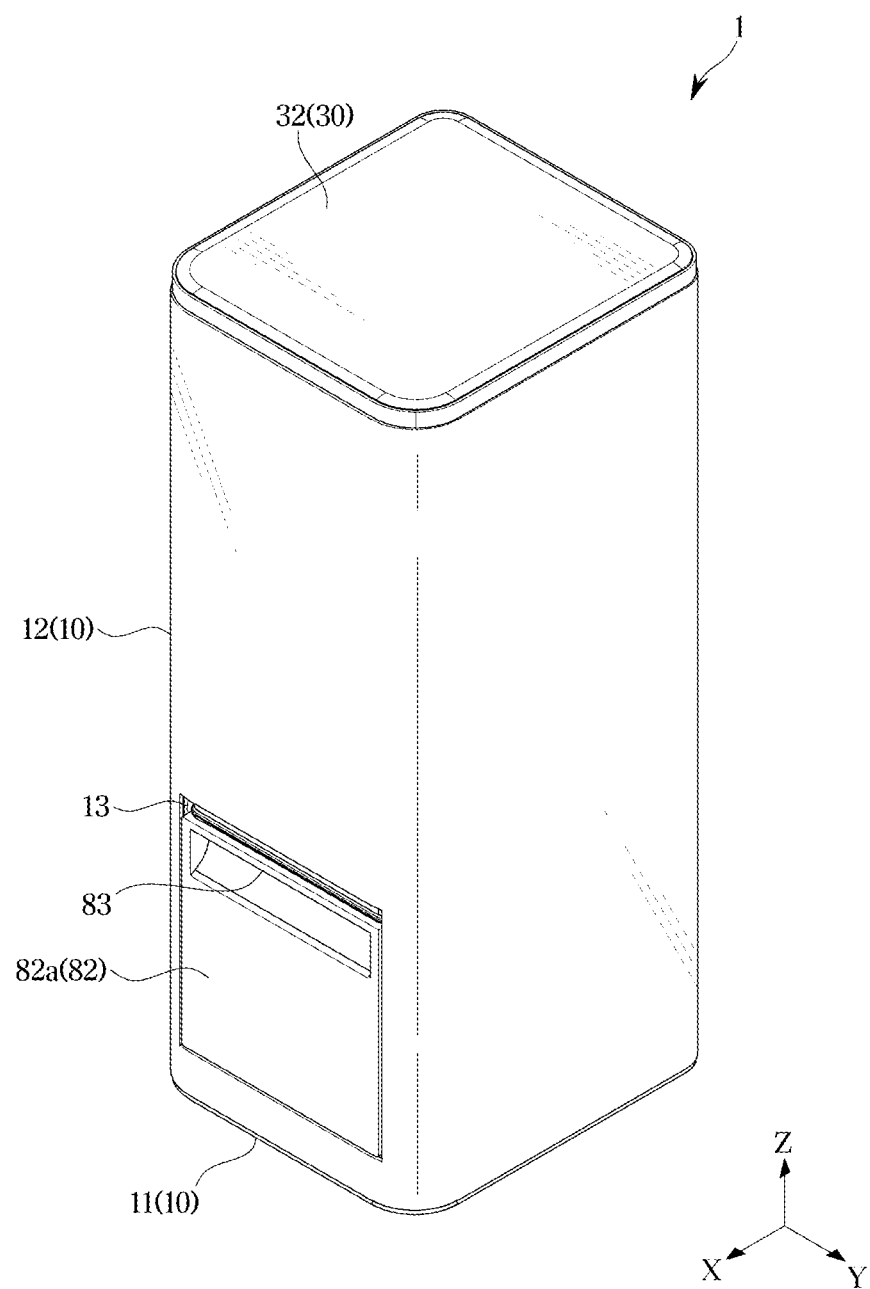
FIG. 1 is a perspective view illustrating a food waste disposer according to an embodiment.

Embodiments described in the specification and configurations shown in the accompanying drawings are merely examples of the present disclosure, and various modifications may replace the embodiments and the drawings of the present disclosure at the time of filing of the present application.

Further, identical symbols or numbers in the drawings of the present disclosure denote components or elements configured to perform substantially identical functions.

Further, terms used herein are only for the purpose of describing particular embodiments and are not intended to limit to the present disclosure. The singular form is intended to include the plural form as well, unless the context clearly indicates otherwise. It should be further understood that the terms "include," "including," "have," and/or "having" specify the presence of stated features, integers, steps, operations, elements, components, and/or groups thereof, but do not preclude the presence or addition of one or more other features, integers, steps, operations, elements, components, and/or groups thereof.

It will be understood that when an element is referred to as being "connected," or "coupled," to another element, it may be directly connected or coupled to the other element or intervening elements may be present. In contrast, when an element is referred to as being "directly connected," or "directly coupled," to another element, there are no intervening elements present.

Further, when it is stated that a member is "on" another member, the member may be directly on another member or a third member may be disposed therebetween.

Further, it should be understood that, although the terms "first," "second," etc. may be used herein to describe various elements, the elements are not limited by the terms, and the terms are only used to distinguish one element from another. For example, a first element could be termed a second element, and similarly, a second element could be termed a first element without departing from the scope of the present disclosure. The term "and/or" includes combinations of one or all of a plurality of associated listed items.

Meanwhile, the terms "front and rear directions", "front side", "rear side", "upper portion", "lower portion", "upper side", "lower side", etc. used in the following description are defined based on the drawings, and by the terms may not restrict the shape and position of each component. For example, a direction of air discharged from a discharge port (an outlet) 17 to be described below may be defined as a front, and a direction opposite to the front may be defined as a rear. Specifically, a direction toward which an inlet 15 faces may be referred to as a rear, and a direction opposite to the rear may be referred to as a front.

For example, as shown in FIGS. 1 to 4, a direction in which a storage case 82 faces in a food waste disposer 1 may be defined as a forward direction (+X direction), and a direction opposite to the forward direction may be defined as a backward direction (−X direction) in the food waste disposer 1. In addition, for example, the X direction may be referred to as a front-rear direction, the Y direction may be referred to as a left-right direction, and the Z direction may be referred to as a vertical direction. However, this is only referred to with reference to the drawings for the sake of convenience of description, and the disclosure is not limited thereto.

Hereinafter, an embodiment according to the disclosure will be described in detail with reference to the accompanying drawings.

Figure 2:
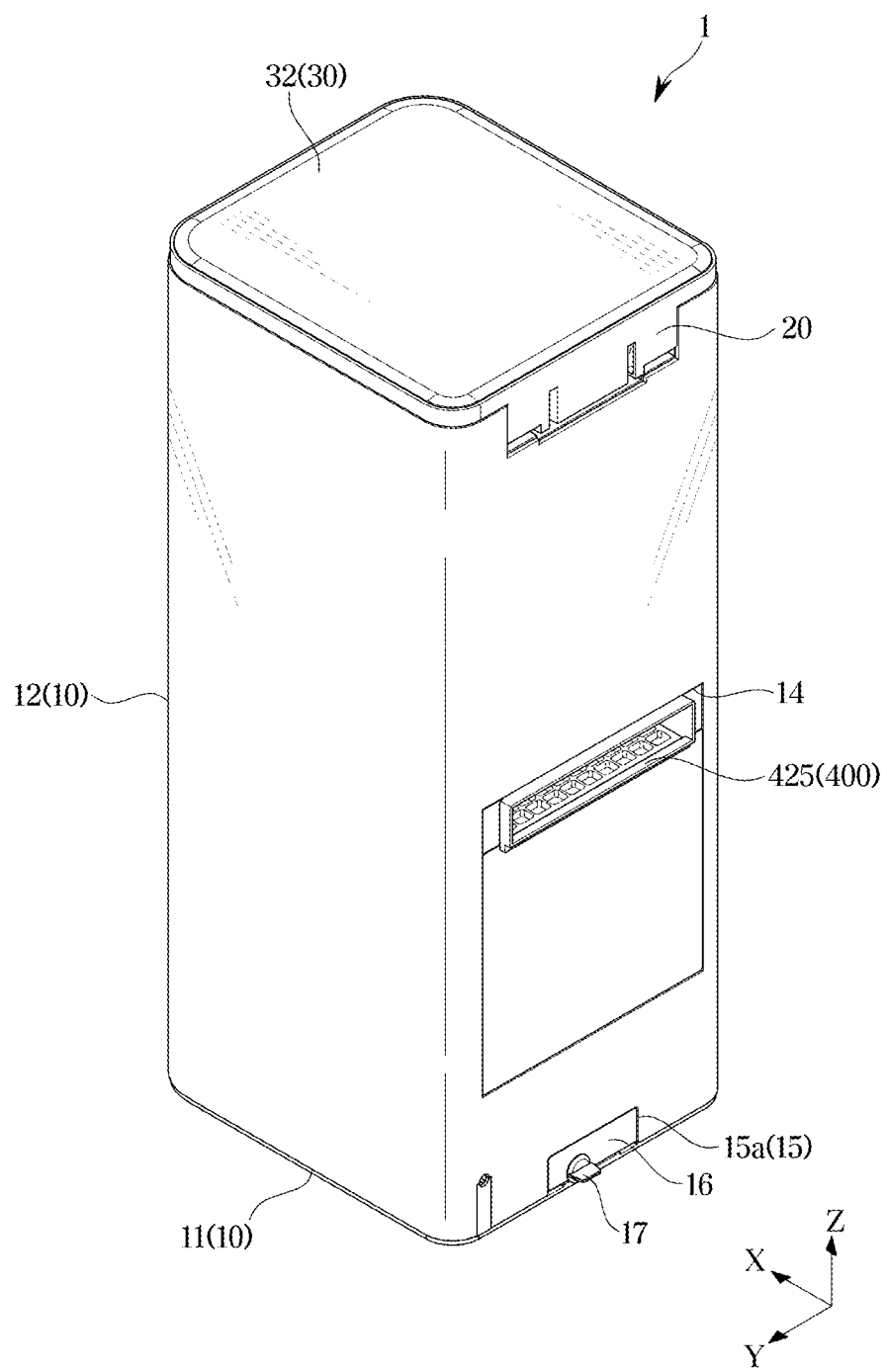
FIG. 2 is a rear perspective view illustrating a food waste disposer according to an embodiment.

FIG. 1 is a perspective view illustrating a food waste disposer according to an embodiment. FIG. 2 is a rear perspective view illustrating a food waste disposer according to an embodiment.

Referring to FIGS. 1 and 2, a food waste disposer 1 may include a housing 10 and a cover 30 covering an upper portion of the housing 10.

The housing 10 may form the external appearance of the food waste disposer 1. For example, the housing 10 may include a base frame 11 and a side frame 12 disposed on an upper side of the base frame 11. The base frame 11 and the side frame 12 may be detachably coupled to each other.

In the drawings, the side frame 12 is illustrated as an integral body, but is not limited thereto. The side frame 12 may be provided as a plurality of frames that may be coupled to each other. In this case, various parts disposed inside the food waste disposer 1 may be accessed by separating the plurality of frames.

For example, the base frame 11 may form a bottom surface of the food waste disposer 1, and the side frame 12 may form a side surface of the food waste disposer 1. For example, the side frame 12 may include four sidewalls. However, the disclosure is not limited thereto, and the side frame 12 may be provided in various shapes as long as it can cover various parts provided inside the housing 10.

The food waste disposer 1 may include an accommodating part 13 that is formed inside the housing 10 by the front of the housing 10 being opened.

The accommodating part 13 may be provided to accommodate a storage case 82 to be described below. The storage case 82 may be provided to be inserted into and withdrawn from the accommodating part 13. For example, the storage case 82 may be withdrawn from or inserted into the accommodating part 13 by sliding along the front-rear direction.

The storage case 82 may have a front surface 82a on which a grip part 83 provided to be gripped is disposed. For example, the grip part 83 may have a shape that is recessed backward from the front surface 82a of the storage case 82.

Although not shown in the drawing, the storage case 82 may be provided with a window on the front surface 82a thereof such that the amount of food waste inside the storage case 82 may be visually checked.

The food waste disposer 1 may include an exhaust hole 14 provided at the rear side of the housing 10. The exhaust hole 14 may be provided to communicate with a discharge part 425 of the filter device 400 to be described below. The exhaust hole 14 may be opened to the rear side of the housing 10 such that the discharge part 425 of the filter device 400 to be described below communicates with the outside of the housing 10. The filter device 400 may filter exhaust gas and discharge the filtered exhaust gas to the outside of the housing 10. In this case, the filtered gas may be discharged to the outside of the housing 10 through the exhaust hole 14.

Figure 3:
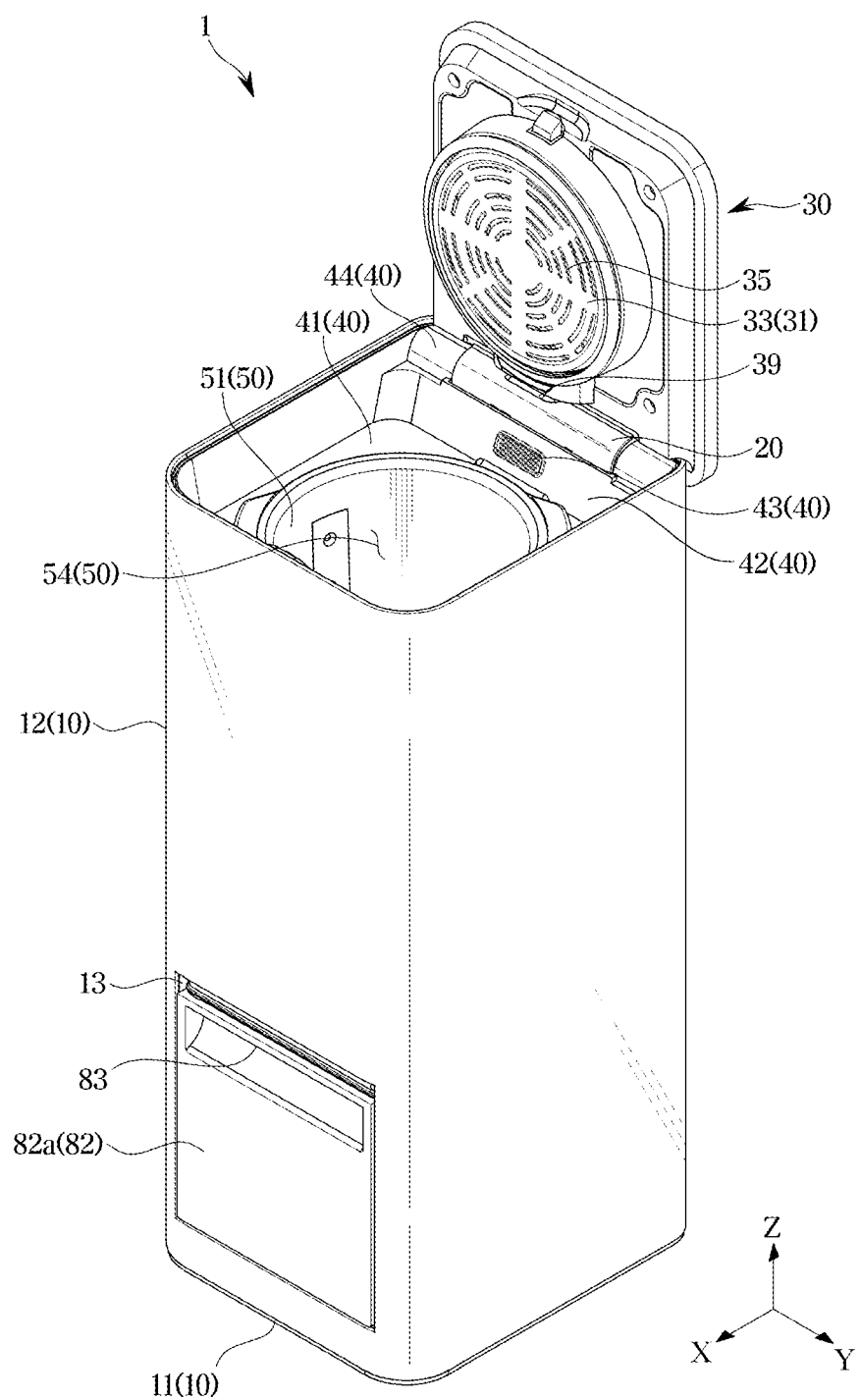
FIG. 3 is a perspective view illustrating a state in which a cover of a food waste disposer according to an embodiment is opened.
Figure 4:
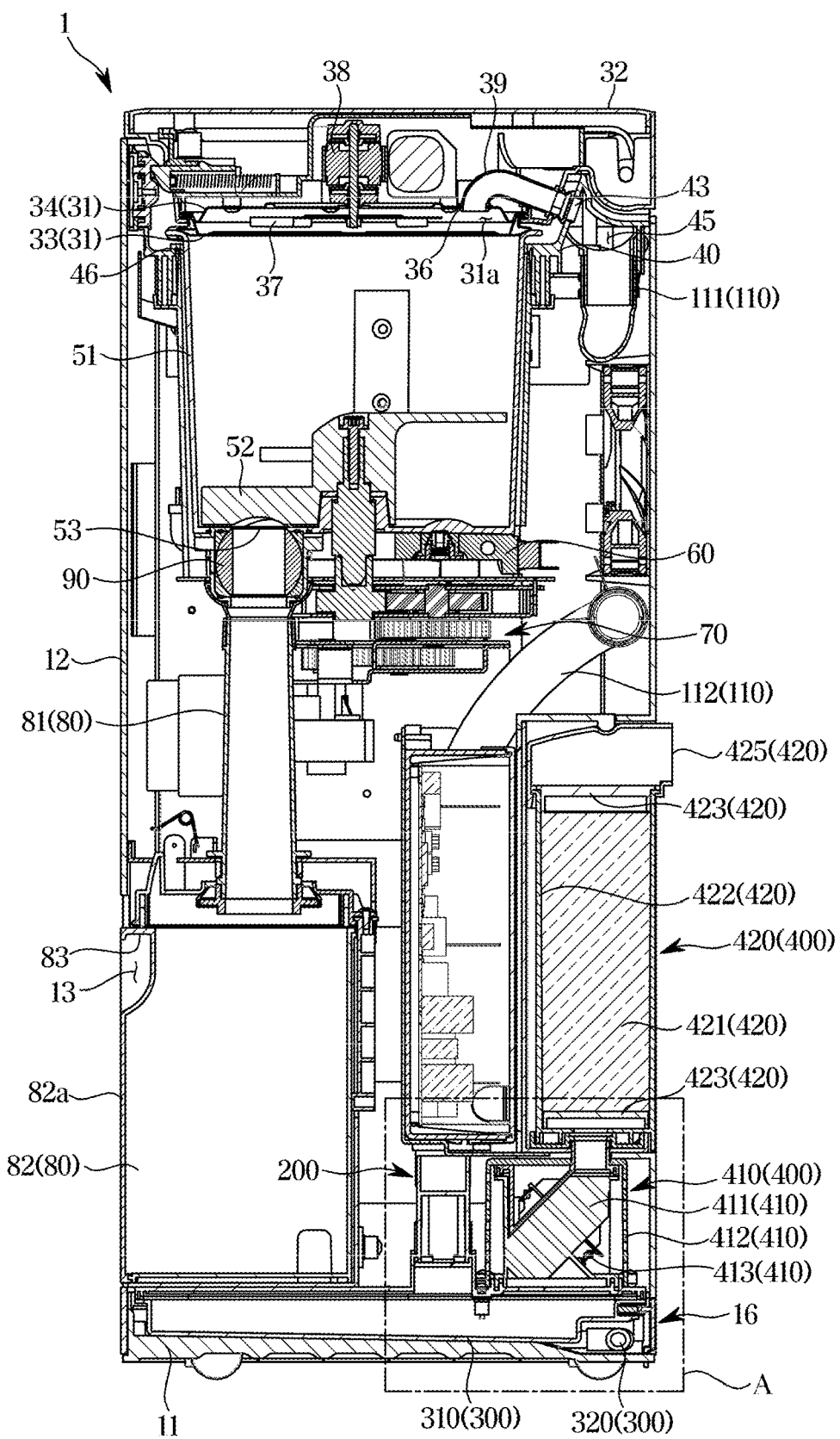
FIG. 4 is a cross-sectional view illustrating a food waste disposer according to an embodiment.

FIG. 3 is a perspective view illustrating a state in which a cover of a food waste disposer according to an embodiment is opened. FIG. 4 is a cross-sectional view illustrating a food waste disposer according to an embodiment.

The food waste disposer 1 may include a support frame 40.

The support frame 40 may be provided to support a container 50 inside the housing 10. The support frame 40 may support an upper portion of the container 50. The support frame 40 may support the outer peripheral surface of the container 50 such that the container 50 is stably supported inside the housing 10.

The support frame 40 may include a hinge coupling part 44 provided to be coupled to a hinge 20.

The support frame 40 may include a base part 41 and an extension part 42.

The base part 41 may form an upper surface of the support frame 40. The extension part 42 may extend from the base part 41. The extension part 42 may extend upward to correspond to the side frame 12. For example, the hinge coupling part 44 may be formed on one side of the extension part 42 adjacent to the hinge 20.

The base part 41 may include an insertion hole 46 into which the container 50 may be inserted. The container 50 may be inserted into the insertion hole 46 and supported by the support frame 40.

The support frame 40 may include a suction part 43. For example, the suction part 43 may include a plurality of suction holes. The suction part 43 may be provided to communicate with the container 50. For example, when the cover 30 closes the housing 10, the suction part 43 may be provided to communicate with the container 50 through the cover 30. While the cover 30 closes the housing 10, the exhaust gas in the container 50 flows into the cover 30, and the exhaust gas flowing into the cover 30 is sucked into the suction part 43 by a guide duct 39 to be described below. Detailed descriptions thereof will be provided below.

The support frame 40 may include a connection passage 45. The connection passage 45 may form a portion of a passage through which the exhaust gas flows. For example, the connection passage 45 may connect the guide duct 39 to an exhaust duct 110 to be described below. The connection passage 45 may connect the guide duct 39 to a first duct part 111 of the exhaust duct 110 to be described below.

The food waste disposer 1 may include the container 50.

The container 50 may be provided to accommodate food waste therein. The container 50 may be disposed inside the housing 10.

The container 50 may include an inlet 54 having an open top. The user may put food waste into the container 50 through the inlet 54 of the container 50. A container cover part 31 of the cover 30 may cover the inlet 54. The container cover part 31 may have a size corresponding to that of the inlet 54.

The container 50 may be provided to dispose of food waste. For example, the container 50 may process food waste through at least one of drying, grinding, or microbial fermentation.

Hereinafter, for the sake of convenience of description, the container 50 will be illustrated a grinding device 50 provided to grind food waste as an example. However, this is only an example, and the container 50 may be provided to dispose of food waste in various ways.

The grinding device 50 may include a grinding case 51 in which food waste is accommodated and grinded.

The grinding case 51 may include an inlet 54 having an open top. Food waste may be introduced into the grinding case 51 through the inlet 54.

The grinding case 51 may include an outlet 53 that is opened such that the grinded food waste is transferred to a storage device 80 to be described below.

The grinding device 50 may include a grinder 52 provided inside the grinding case 51. The grinder 52 may be provided to grind the food waste put into the grinding case 51. For example, the grinder 52 may include a plurality of blades.

The grinder 52 may be detachably mounted inside the grinding case 51. The grinder 52 may be rotatably provided inside the grinding case 51. The grinder 52 may be rotatably mounted on the bottom surface of the grinding case 51.

The cover 30 may be rotatably coupled to one side of the support frame 40 to open and close the inlet 54 of the grinding case 51.

The food waste disposer 1 may include a heat generating device 60.

The heat generating device 60 may be disposed to heat the grinding device 50 at a lower side of the grinding device 50. The heat generating device 60 may be disposed at a lower side of the grinding case 51 of the grinding device 50. For example, the heating device 60 may have a heating wire accommodated therein.

The food waste disposer 1 may include a driving device 70.

The driving device 70 may be disposed at a lower side of the grinding device 50 and the heat generating device 60. The driving device 70 may be provided to transmit power to the grinding device 50. The driving device 70 may transmit power to the grinder 52. The driving device 70 may transmit power to a valve assembly 90 to be described below.

The food waste disposer 1 may include the valve assembly 90.

The valve assembly 90 may be provided to open and close the outlet 53 of the grinding device 50 by rotating. When the valve assembly 90 opens the outlet 53, the grinded food waste inside the grinding case 51 may be transferred to the storage case 82 of the storage device 80 through a transfer duct 81. When the valve assembly 90 closes the outlet 53, the grinded food waste inside the grinding case 51 may not flow into the transfer duct 81.

The valve assembly 90 may receive power from the driving device 70.

The food waste disposer 1 may include the storage device 80.

The storage device 80 may include the storage case 82 and the transfer duct 81.

The transfer duct 81 may transfer food waste introduced from the grinding device 50 to the storage case 82. The transfer duct 81 may transfer the food waste grinded and dried in the grinding device 50 to the storage case 82. The transfer duct 81 may include a shape extending in the vertical direction (the Z direction).

The storage case 82 may be provided to accommodate the food waste transferred from the grinding device 50. The storage case 82 may be provided to receive and store the food waste grinded and dried by the grinding device 50.

The storage case 82 may be accommodated in the accommodating part 13. The storage case 82 may be provided in a way to be withdrawn from or inserted into the accommodating part 13. The storage case 82 may be slidable in the front-rear direction (the X direction). The storage case 82 may be detachably coupled to the housing 10. The storage case 82 may include the grip part 83 provided on the front surface 82a to be gripped. For example, the user may grip the grip part 83 to withdraw the storage case 82 from the accommodating part 13 or insert the storage case 82 into the accommodating part 13.

The cover 30 may be provided to open and close the upper portion of the housing 10. The cover 30 may be provided to be rotated with respect to the housing 10 through the hinge 20.

The cover 30 may include a container cover part 31 and a top plate 32.

The container cover part 31 may be provided to cover the container (the grinding device) 50. The container cover part 31 may be provided to cover the upper portion of the grinding case 51 provided to accommodate and grind food waste. The container cover part 31 may be provided to cover the inlet 54.

The top plate 32 may form an upper surface of the food waste disposer 1.

The container cover part 31 may include a lower frame 33 provided to face the grinding case 51 when the housing 10 is closed by the cover 30, and an upper frame 34 coupled to the upper side of the lower frame 33. The lower frame 33 may be coupled to the upper frame 34 while forming a predetermined space 31a therebetween.

In the predetermined space 31a formed between the lower frame 33 and the upper frame 34, a circulation fan 37 may be provided. The circulation fan 37 may allow the heat inside the grinding case 51 to be evenly spread. Through the circulation fan 37, a convection phenomenon may occur inside the grinding case 51. As a result, the internal temperature of the grinding case 51 may become uniform, and the drying efficiency may be improved.

A circulation fan driving part 38 may be provided to drive the circulation fan 37. The circulation fan driving part 38 may be provided between the top plate 32 and the container cover part 31.

The lower frame 33 may include a first communication hole 35. The upper frame 34 may include a second communication hole 36.

In order to guide the exhaust gas generated from the grinding case 51 to an exhaust duct 110 to be described below, a guide duct 39 may be provided. For example, the guide duct 39 may have one end connected to the container cover part 31, and the other end connected to the suction part 43 of the support frame 40. For example, the one end of the guide duct 39 may communicate with the upper frame 34 of the container cover part 31, and the other end of the guide duct 39 may communicate with the connection passage 45 of the support frame 40.

The guide duct 39 may be provided to interwork with the rotation of the cover 30. For example, when the cover 30 closes the housing 10, the one end of the guide duct 39 may be disposed to face the grinding case 51 in linkage with the container cover part 31 For example, when the cover 30 closes the housing 10, the one end of the guide duct 39 may be provided to face downward.

For example, the guide duct 39 may be mounted inside the cover 30. The one end of the guide duct 39 may be fixed to the upper frame 34. The guide duct 39 may include a curved shape. However, the disclosure is not limited thereto, and the guide duct 39 may be provided in various positions and shapes as long as it can guide the exhaust gas in the grinding case 51 to the exhaust duct 110.

The exhaust gas in the grinding case 51 may be introduced into the space 31a of the container cover part 31 through the first communication hole 35 of the lower frame 33. The exhaust gas introduced into the space 31a of the container cover part 31 may be introduced into the one end of the guide duct 39 through the second communication hole 36 of the upper frame 34. The exhaust gas introduced into the one end of the guide duct 39 may be introduced into the connection passage 45 through the suction part 43 of the support frame 40. The exhaust gas flowing into the connection passage 45 may flow into the first duct part 111 of the exhaust duct 110. However, the disclosure is not limited to the above-described example, and the exhaust gas in the grinding case 51 may be directly introduced into the first duct part 111 of the exhaust duct 110.

Figure 5:
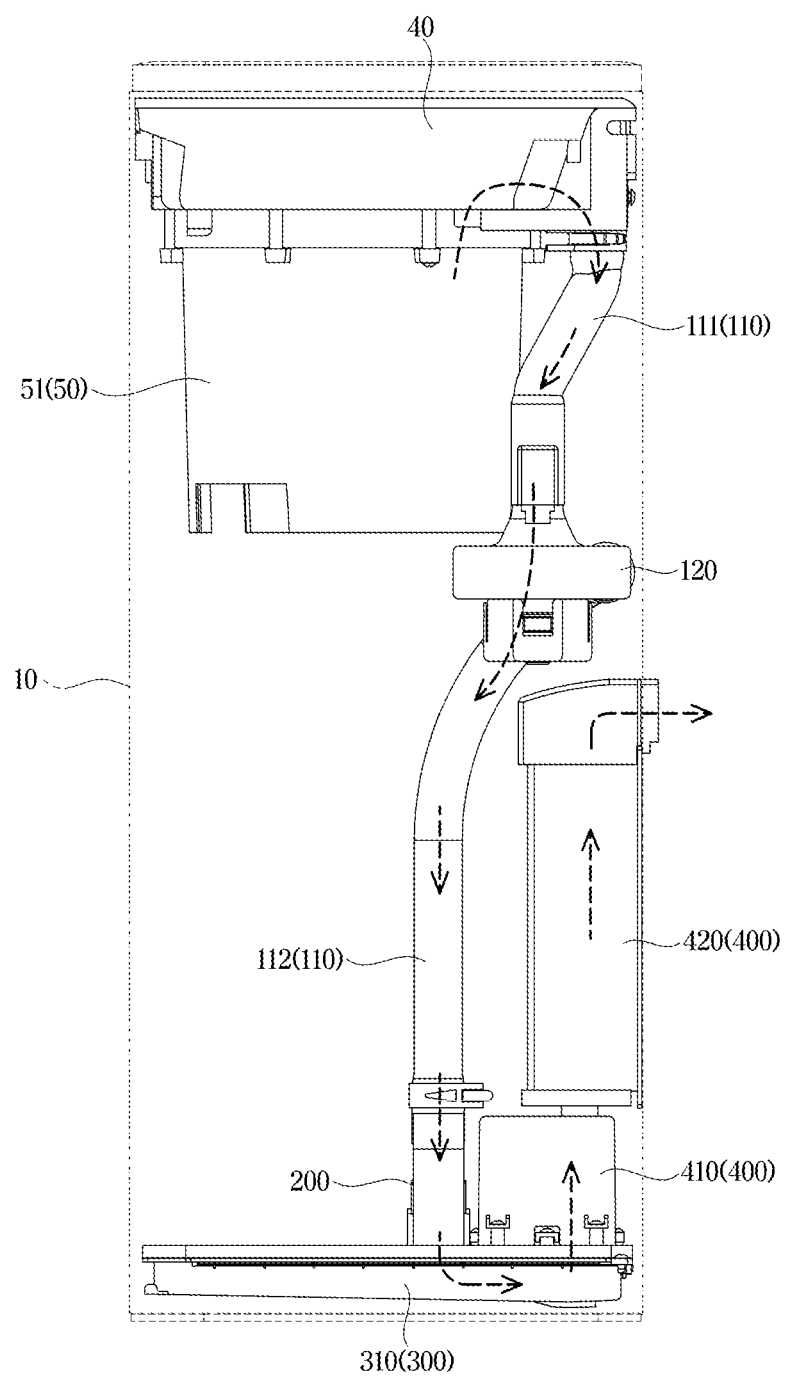
FIG. 5 is a schematic diagram illustrating a deodorizing structure of a food waste disposer according to an embodiment.
Figure 6:
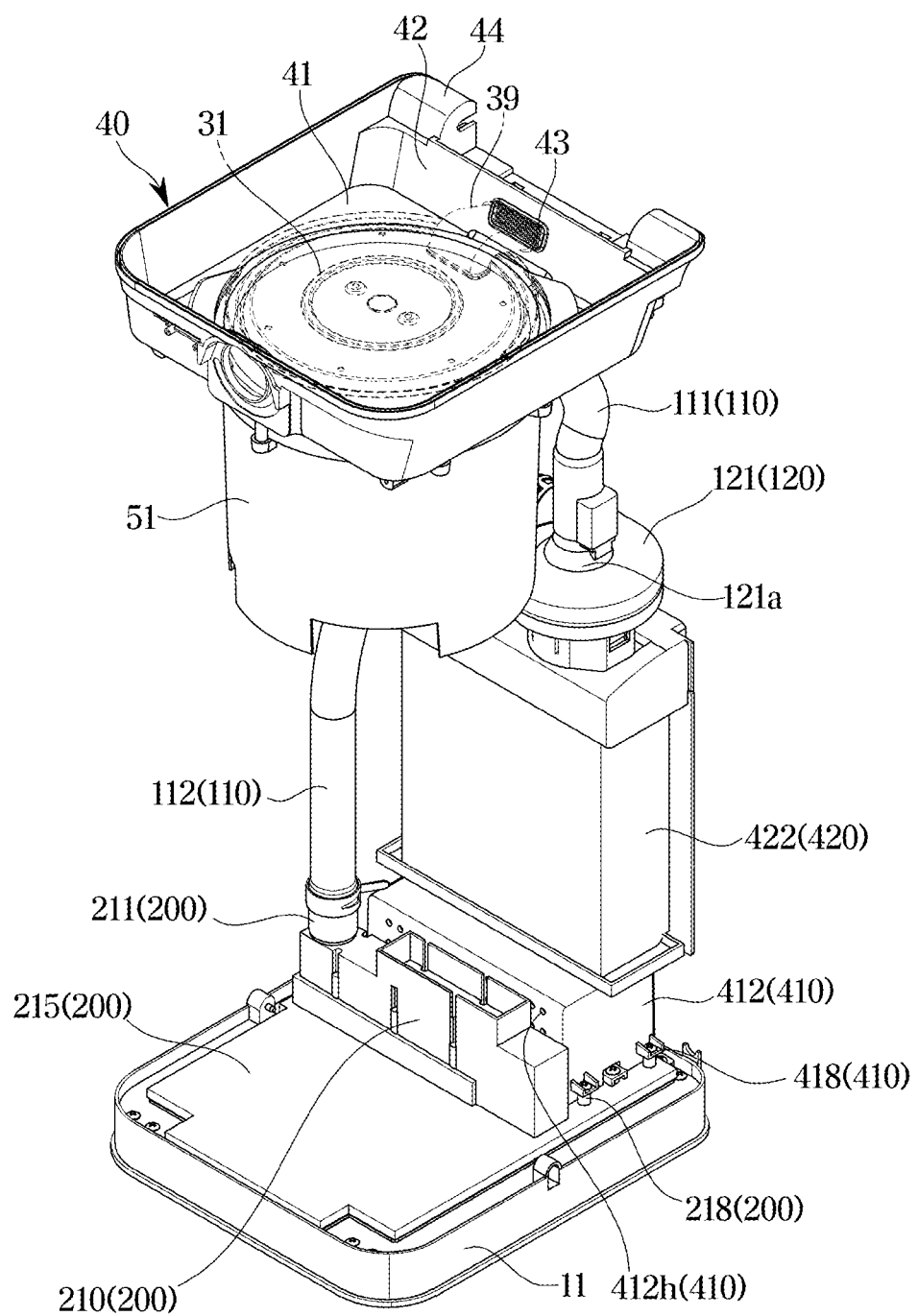
FIG. 6 is a schematic perspective view illustrating a deodorizing structure of a food waste disposer according to an embodiment.
Figure 7:
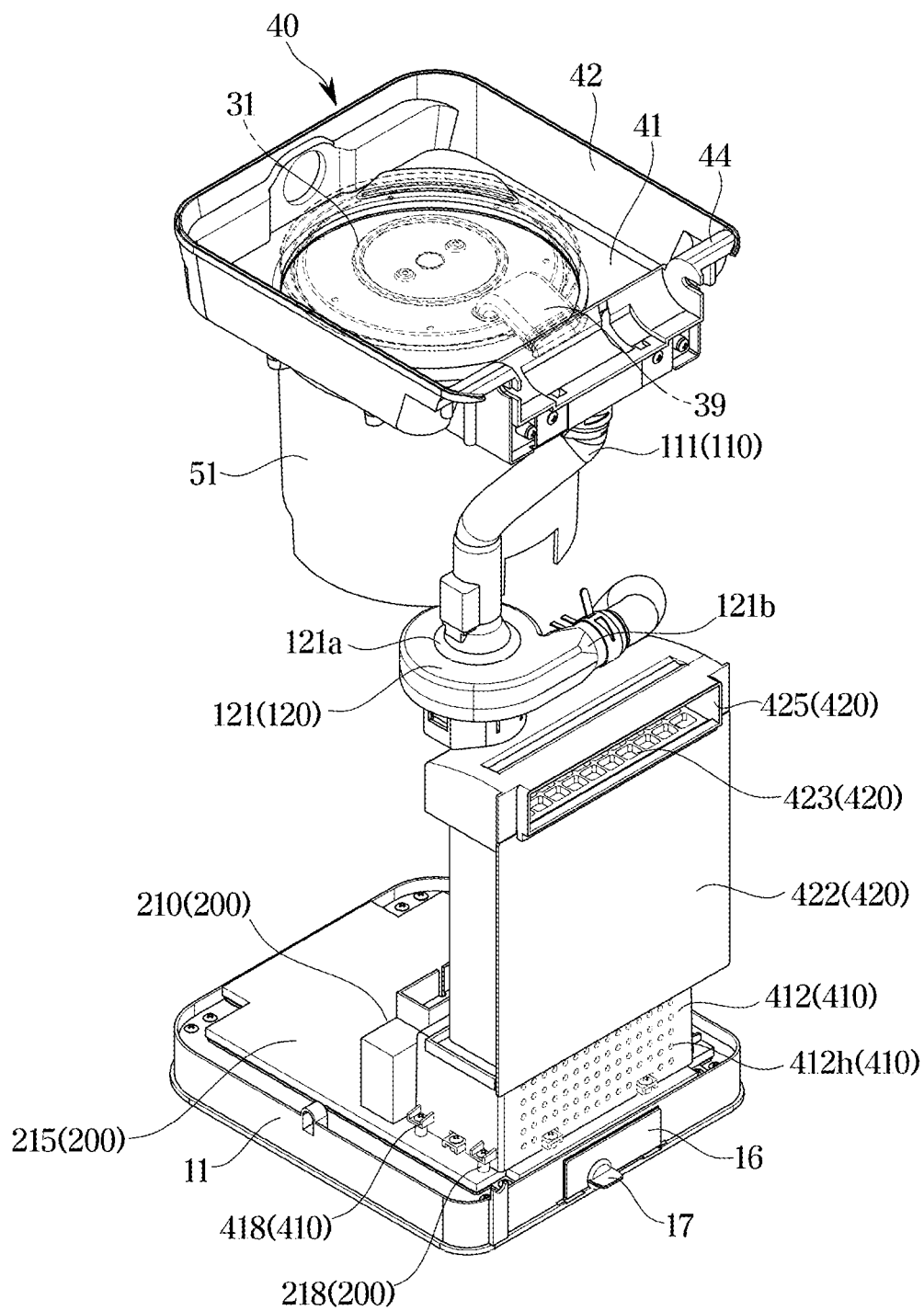
FIG. 7 is a schematic rear perspective view illustrating a deodorizing structure of a food waste disposer according to an embodiment.

FIG. 5 is a schematic diagram illustrating a deodorizing structure of a food waste disposer according to an embodiment. FIG. 6 is a schematic perspective view illustrating a deodorizing structure of a food waste disposer according to an embodiment. FIG. 7 is a schematic rear perspective view illustrating deodorizing structure of a food waste disposer according to an embodiment.

The food waste disposer 1 may include exhaust gas guide devices 110 and 120.

The exhaust gas guide device may include an exhaust duct 110.

The exhaust gas guide device may include an exhaust fan assembly 120.

The exhaust gas generated from the grinding device 50 may flow in the exhaust duct 110. The exhaust duct 110 may form an exhaust passage through which exhaust gas flows.

For example, when the cover 30 closes the housing 10, the exhaust duct 110 may be provided to accommodate the exhaust gas from the grinding device 50. When the cover 30 covers the inlet 54, the exhaust duct 110 may communicate with the grinding case 51 and accommodate exhaust gas from the grinding case 51.

The exhaust duct 110 may be provided to communicate with the grinding device 50. The exhaust duct 110 may be allowed to directly communicate with the grinding device 50, or indirectly communicate with the grinding device 50 through separate components.

For example, exhaust gas generated from the grinding device 50 may flow, through the container cover part 31 of the cover 30, the guide duct 39, and the support frame 40, into the exhaust duct 110. However, the disclosure is not limited thereto, and the exhaust gas generated from the grinding device 50 may be introduced into the exhaust duct 110 without passing through some of the container cover part 31 of the cover 30, the guide duct 39, and the support frame 40. Alternatively, the exhaust gas generated from the grinding device 50 may further pass through additional components other than the container cover part 31 of the cover 30, the guide duct 39, and the support frame 40 before flowing into the exhaust duct 110.

The exhaust duct 110 may include a first duct part 111 and a second duct part 112.

For example, the first duct part 111 may have one end connected to the connection passage 45 of the support frame 40, and the other end connected to a first connection part 121a of the exhaust fan assembly 120. For example, the second duct part 112 may have one end connected to a second connection part 121b of the exhaust fan assembly 120 and the other end connected to an inlet 211 of a condensation chamber 200 to be described below.

The exhaust fan assembly 120 may include an exhaust fan (not shown), an exhaust fan driving part (not shown) for driving the exhaust fan, and a fan case 121 accommodating the exhaust fan and the exhaust fan driving part.

The exhaust fan may communicate with the exhaust duct 110 such that the exhaust gas forms an intake airflow from the grinding device 50 toward the filter device 400. The exhaust fan may be provided on an exhaust passage formed by the exhaust duct 110. The exhaust gas may be allowed to flow more smoothly in the exhaust duct 110 by the exhaust fan.

The fan case 121 may include the first connection part 121a and the second connection part 121b. The first connection part 121a may be connected to the first duct part 111, and the second connection part 121b may be connected to the second duct part 112. For example, the first connection part 121a may be provided on the upper side of the fan case 121, and the second connection part 121b may be provided on the lateral side of the fan case 121.

The exhaust fan may be disposed such that the suction side thereof faces the first duct part 111 and the discharge side thereof faces the second duct part 112. The suction side of the exhaust fan may correspond to the first connection part 121a, and the discharge side of the exhaust fan may correspond to the second connection part 121b.

The food waste disposer 1 may include a condensation chamber 200.

The condensation chamber 200 may be provided to remove moisture in the exhaust gas introduced from the exhaust duct 110. The condensation chamber 200 may be provided to remove moisture in the exhaust gas directed to the filter device 400. The condensation chamber 200 may be provided to lower the moisture content of the exhaust gas before the exhaust gas flows into a catalytic filter part 410 of the filter device 400 to be described below. Details thereof will be described below.

The food waste disposer 1 may include a filter device 400.

The filter device 400 may filter the exhaust gas generated from the grinding device 50 and discharge the filtered exhaust gas to the outside of the housing 10. The filter device 400 may sterilize and/or deodorize the exhaust gas.

For example, the filter device 400 includes a catalytic filter part 410 provided to filter exhaust gas passed through the exhaust duct 110 and a deodorizing filter part 420 provided to filter exhaust gas passed through the catalytic filter part 410 and communicate with the outside of the outside. By the catalytic filter part 410 provided in the filter device 400, the deodorizing performance of the deodorizing filter part 420 may be improved, and the life of the deodorizing filter part 420 may be extended.

The filter device 400 may be provided to accommodate the exhaust gas having moisture thereof reduced or removed by passing through the condensation chamber 200.

In other words, exhaust gas passed through the exhaust duct 110 may be provided to be condensed by the condensation chamber 200 before being introduced into the filter device 400. For example, exhaust gas passed through the exhaust duct 110 may flow into the condensation chamber 200 and then sequentially pass through the catalytic filter part 410 and the deodorizing filter part 420. Accordingly, degradation of the performance of the catalytic filter part 410 due to moisture penetration may be prevented. In addition, since the replacement cycle of a deodorizing filter 421 of the deodorizing filter part 420 is increased, the hassle of replacing the filter may be eliminated. As a result, the convenience of use of the food waste disposer 1 may be improved.

Figure 8:
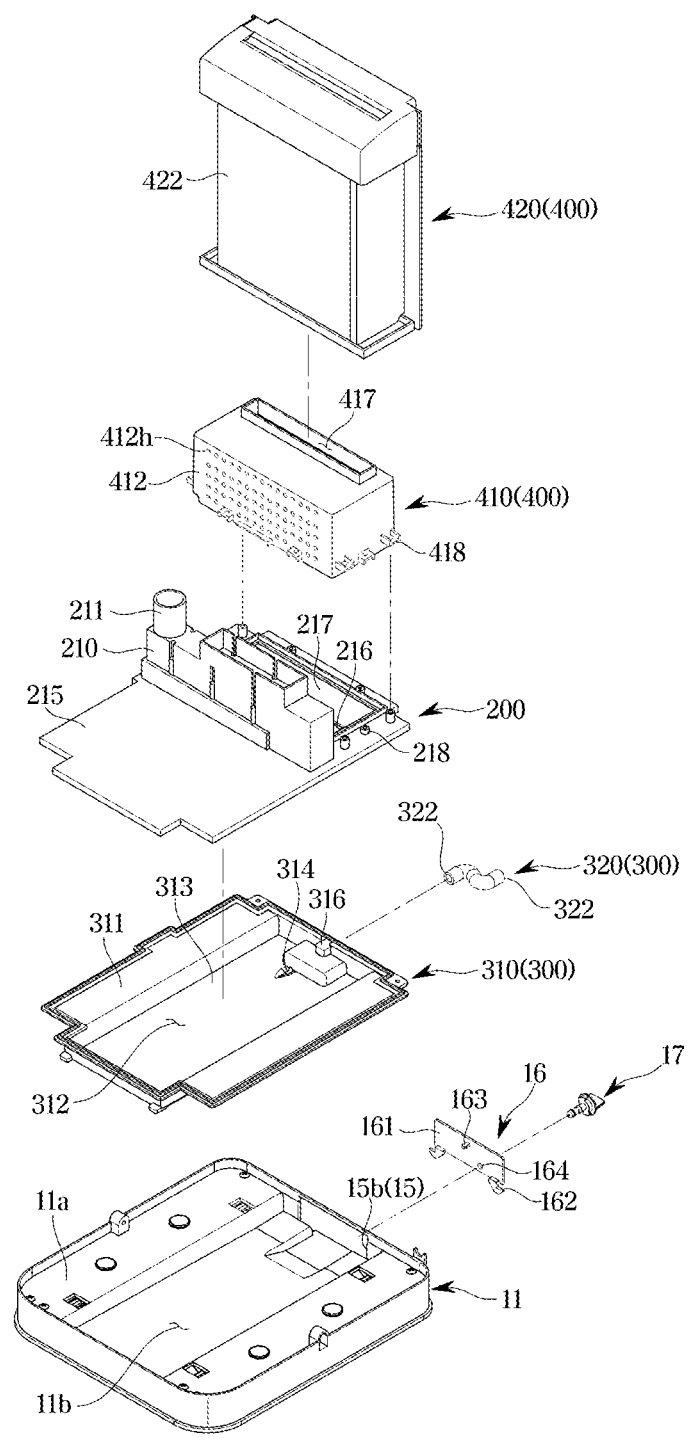
FIG. 8 is an exploded view illustrating a filter device, a condensation chamber, a drainage device, and a base frame of a food waste disposer according to an embodiment.
Figure 9:
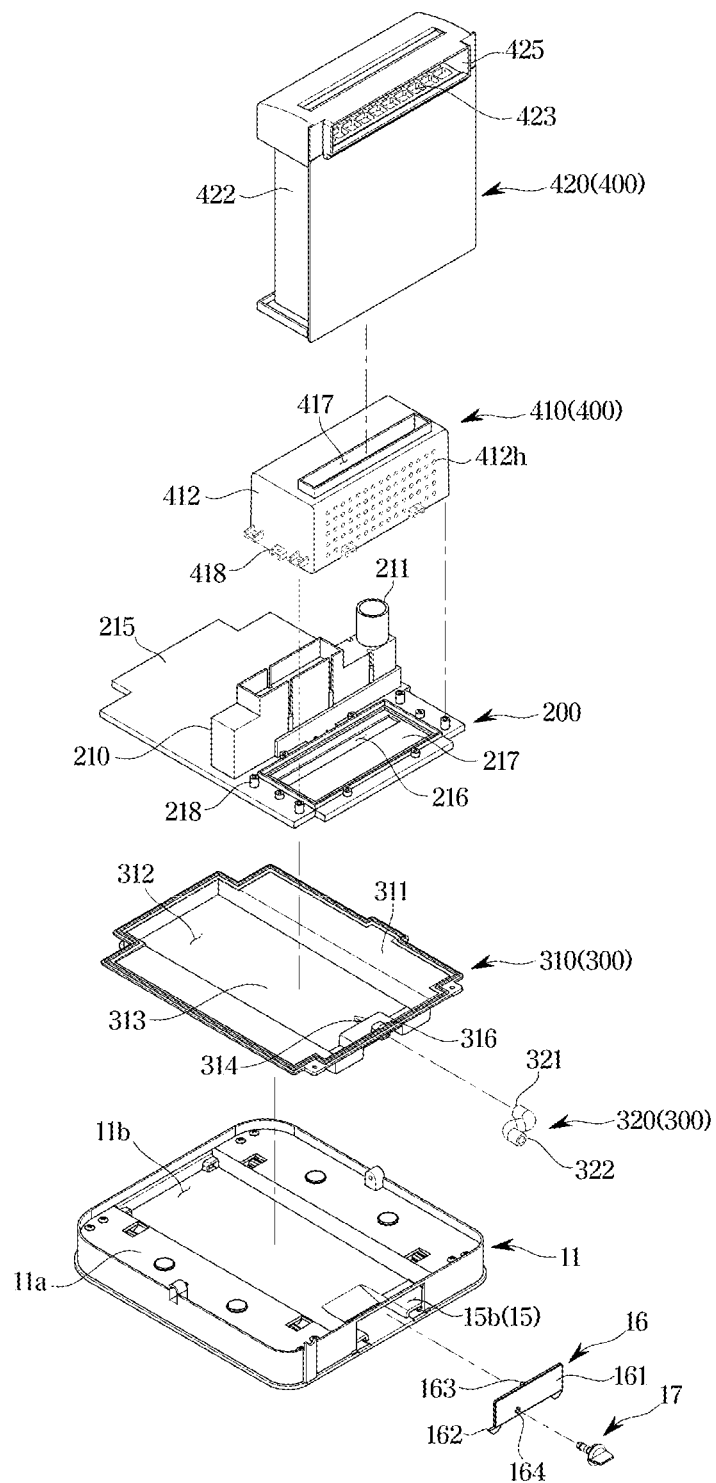
FIG. 9 is a rear view illustrating a filter device, a condensation chamber, a drainage device, and a base frame of a food waste disposer according to an embodiment.
Figure 10:
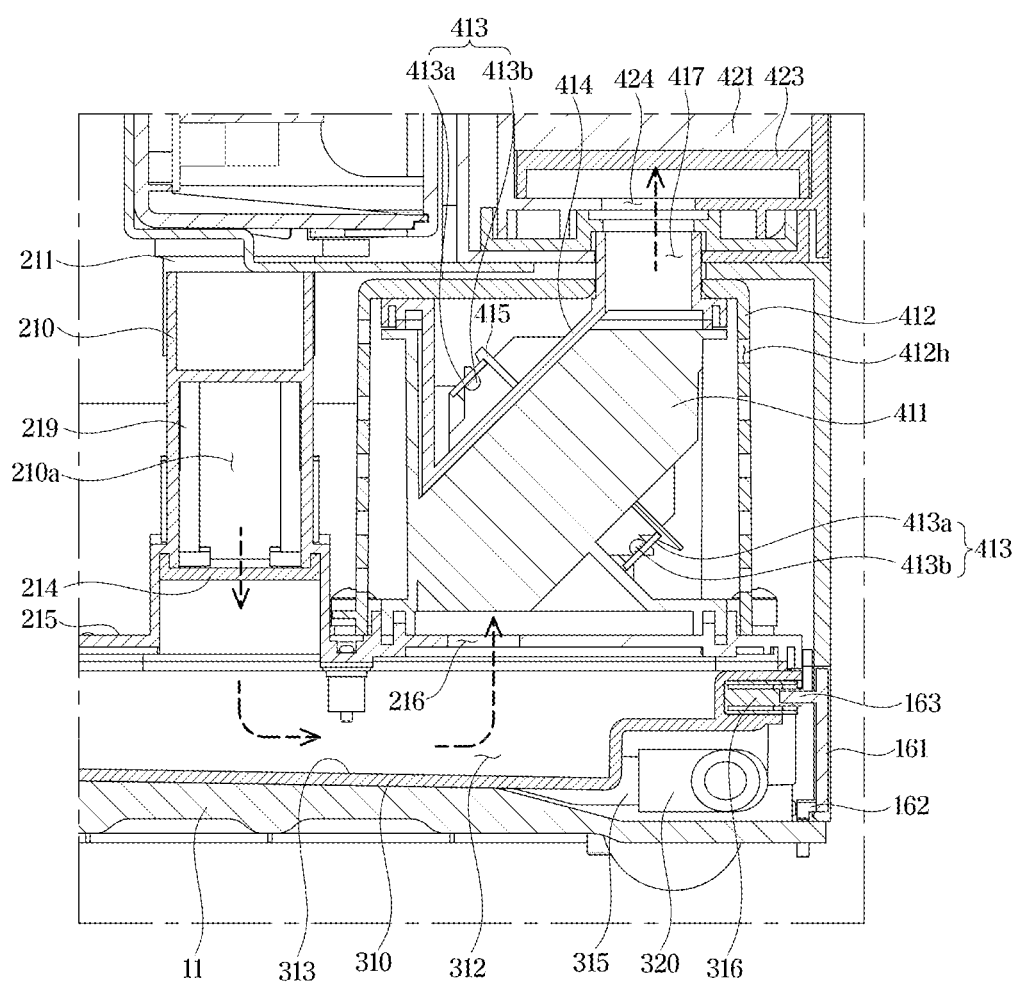
FIG. 10 is an enlarged view of portion A shown in FIG. 4.
Figure 11:
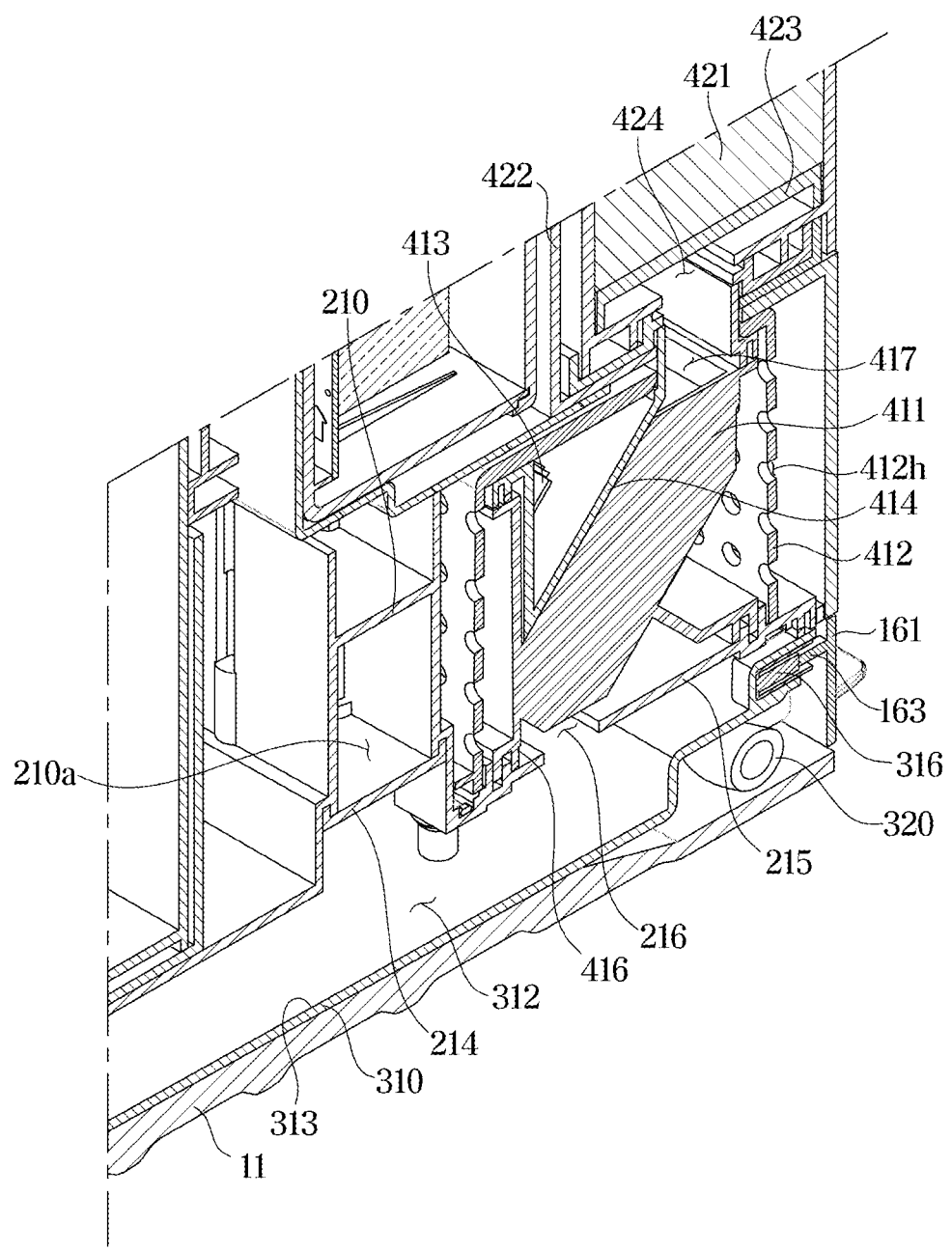
FIG. 11 is a view illustrating a portion of a food waste disposer according to an embodiment.
Figure 12:
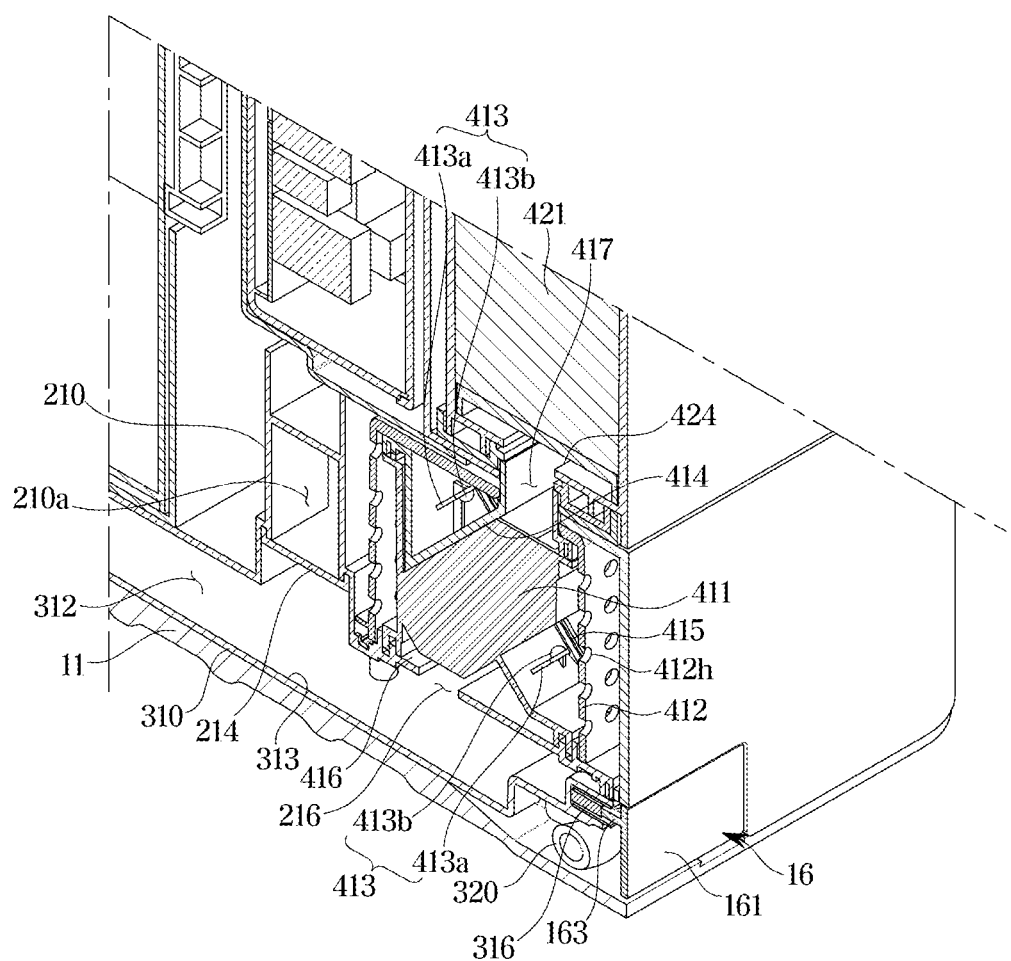
FIG. 12 is a view illustrating the portion of the food waste disposer shown in FIG. 11 in a different direction.
Figure 13:
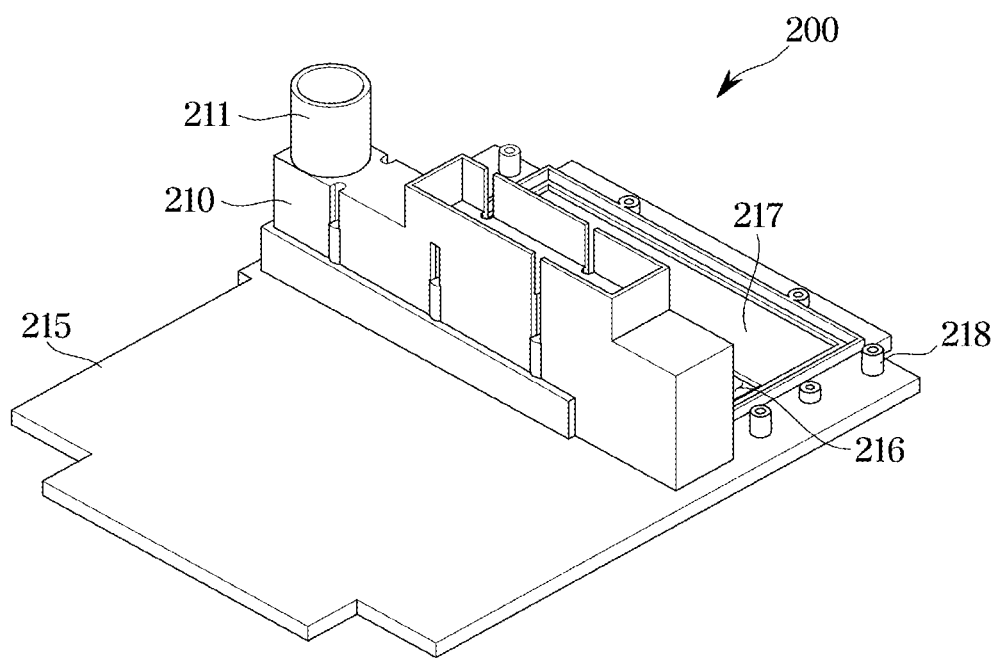
FIG. 13 is a perspective view illustrating a condensation chamber of a food waste disposer according to an embodiment.
Figure 14:
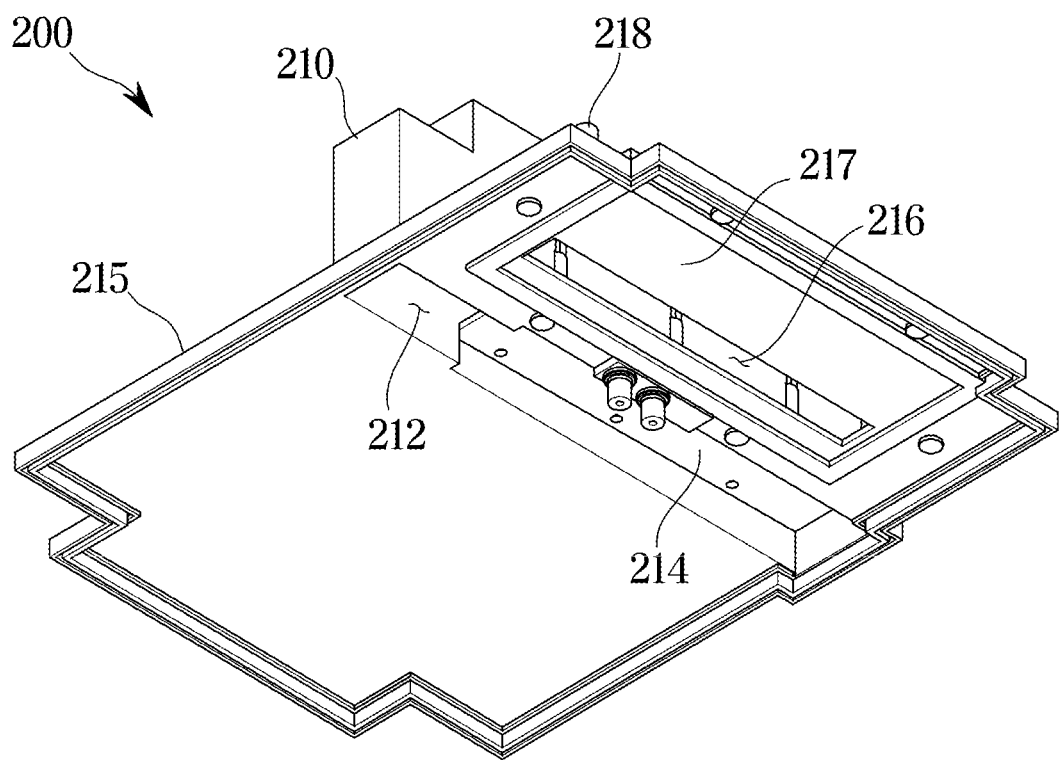
FIG. 14 is a bottom perspective view illustrating a condensation chamber of a food waste disposer according to an embodiment.

FIG. 8 is an exploded view illustrating a filter device, a condensation chamber, a drainage device, and a base frame of a food waste disposer according to an embodiment. FIG. 9 is a rear view illustrating a filter device, a condensation chamber, a drainage device, and a base frame of a food waste disposer according to an embodiment. FIG. 10 is an enlarged view of portion A shown in FIG. 4. FIG. 11 is a view illustrating a portion of a food waste disposer according to an embodiment. FIG. 12 is a view illustrating the portion of the food waste disposer shown in FIG. 11 in a different direction. FIG. 13 is a perspective view illustrating a condensation chamber of a food waste disposer according to an embodiment. FIG. 14 is a bottom perspective view illustrating a condensation chamber of a food waste disposer according to an embodiment.

The food waste disposer 1 may include the condensation chamber 200 and the filter device 400.

The food waste disposer 1 may further include a drainage device 300 provided to collect and drain condensed water generated in the condensation chamber 200.

The condensation chamber 200 may be provided to remove or reduce moisture in the exhaust gas flowing from the exhaust duct 110 to the catalytic filter part 410 of the filter device 400. The condensation chamber 200 may be provided to condense the exhaust gas passing through the exhaust duct 110 to the catalytic filter part 410.

The condensation chamber 200 may include a condensation passage 210a extending in one direction such that the exhaust gas flows. For example, the condensation passage 210a may be provided to extend in the left-right direction (the Y-direction). The exhaust gas introduced into the condensation chamber 200 may be provided to flow in one direction along the extension direction of the condensation passage 210a on the condensation passage 210a.

For example, the condensation chamber 200 may be provided between the filter device 400 and the storage case 82. The condensation chamber 200 may be provided to extend in the left-right direction between the filter device 400 and the storage case 82. The condensation chamber 200 may be arranged compactly between the filter device 400 and the storage case 82 while securing the condensation passage 210a through which the exhaust gas may flow. Accordingly, the usability of the internal space of the food waste disposer 1 may be increased.

The condensation chamber 200 may include a chamber body 210 forming the condensation passage 210a therein. The chamber body 210 may have a substantially box shape. However, the disclosure is not limited thereto, and the chamber body 210 may be provided in various shapes capable of securing the condensation passage 210a of a predetermined length.

The exhaust gas flowing into the condensation chamber 200 from the exhaust duct 110 may be provided to be condensed while flowing through the condensation passage 210a. For example, the relatively high temperature exhaust gas may be cooled while flowing through the relatively low temperature condensation passage 210a of the condensation chamber 200. Accordingly, moisture included in the exhaust gas may be condensed and introduced into a drain tray 310 to be described below, and the exhaust gas having moisture reduced or removed may be introduced into the catalytic filter part 410 of the filter device 400.

The condensation chamber 200 may include an inlet 211 provided at one side of the chamber body 210 such that exhaust gas from the exhaust duct 110 is introduced into the condensation passage 210a. The inlet 211 may be provided to be coupled to an end portion of the second duct part 112. The inlet 211 may include a shape corresponding to the shape of the end portion of the second duct part 112. For example, the inlet 211 may include a circular pipe shape.

The condensation chamber 200 may include an outlet 212 provided on the other side of the chamber body 210 such that the exhaust gas passed through the condensation passage 210a flows out to the catalytic filter part 410. The outlet 212 may communicate with the drain tray 310 to be described below. Accordingly, the exhaust gas discharged through the outlet 212 may pass through the drain train 310 and then flow into the filter device 400 communicating with the drain tray 310, and moisture condensed from the exhaust gas may be introduced into the drain tray 310 through the outlet 212.

For example, the inlet 211 may be formed in the upper portion of the chamber body 210, and the outlet 212 may be formed in the lower portion of the chamber body 210. Accordingly, the exhaust gas may smoothly flow through the inlet 211, the condensation passage 210a, and the outlet 212, and the condensed water may fall downward through the outlet 212 formed in the lower portion of the chamber body 210 such that the condensed water may be easily collected in the drain tray 310.

The condensation chamber 200 may include a partition plate 214 provided to divide the condensation passage 210a from the drain tray 310.

For example, the partition plate 214 may include a shape substantially corresponding to that of the chamber body 210. The partition plate 214 may include a plate shape extending in a substantially left-right direction. The partition plate 214 may be provided to partition at least a portion of the interior of the chamber body 210 having a lower side that is open. An upper inner surface 210b of the chamber body 210 and the partition plate 214 may form the condensation passage 210a. The partition plate 214 may be integrally formed with the chamber body 210. Alternatively, the partition plate 214 may be formed separately from the chamber body 210 and coupled to the interior of the chamber body 210.

For example, the partition plate 214 may partition a portion of the interior of the chamber body 210, and an area not partitioned by the partition plate 214 may form the outlet 212. However, the disclosure is not limited thereto, and the outlet 212 may be provided as a separate part communicating with the condensation passage 210a.

For example, the partition plate 214 may include a shape that is inclined downward in a direction away from the inlet 211. For example, the partition plate 214 may include a shape that is inclined downward in a direction closer to the outlet 212. Accordingly, the exhaust gas may smoothly flow on the condensation passage 210a.

The condensation chamber 200 may include a base plate 215. The base plate 215 may be seated on an upper side of the drain tray 310 to be described below. The base plate 215 may be provided at a lower side of the chamber body 210. The base plate 215 may extend from a lower side of the chamber body 210. That is, the base plate 215 may be provided as one body with the chamber body 210. Alternatively, the base plate 215 may be formed separately from the chamber body 210 to be coupled thereto.

The condensation chamber 200 may include a filter mounting part 217 to which the filter device 400 may be mounted. The catalytic filter part 410 of the filter device 400 may be detachably mounted to the filter mounting part 217. The filter mounting part 217 may be provided on the base plate 215.

The filter mounting part 217 may be provided with a communication part 216. The communication part 216 may be provided to communicate the drain tray 310 with the catalytic filter part 410 mounted on the filter mounting part 217. For example, the communication part 216 may be formed to pass through a portion of the base plate 215. Exhaust gas having moisture removed while passing through the condensation passage 210a may be introduced into a flow-in part 416 of the catalytic filter 410 through the communication part 216.

The filter mounting part 217 may be provided with a coupling part 218. The coupling part 218 of the filter mounting part 217 may be provided to be coupled to a coupling part 418 of the catalytic filter 410. For example, the coupling part 218 and the coupling part 418 may each be provided with a hole, and a separate fastening member may be provided to be coupled to each hole. However, the disclosure is not limited thereto, and various coupling methods may be used.

The condensation chamber 200 may include a reinforcing member 219. The reinforcing member 219 may be provided on an inner wall of the chamber body 210 to reinforce the rigidity of the chamber body 210. The reinforcing member 219 may be provided in plural, and the plurality of reinforcing members 219 may be arranged to be spaced apart from each other.

The condensation chamber 200 may include a baffle plate 220 provided in the condensation passage 210a to obstruct the flow of exhaust gas. By including the baffle plate 220, the condensation chamber 200 may more effectively condense the exhaust gas flowing through the condensation passage 210a. For example, since the baffle plate 200 obstructs the flow of the exhaust gas, a predetermined time for the exhaust gas to stay in the condensation passage 210a may be secured, so that the exhaust gas may be effectively cooled while flowing through the condensation passage 210a. That is, moisture contained in the exhaust gas may be effectively removed.

The baffle plate 220 may include a plurality of through holes 222h and 223h. The plurality of through holes 222h and 223h may be provided to reduce a flow loss of the exhaust gas passing through the condensation passage 210a. Details thereof will be described below.

Referring to FIGS. 8 to 12, the drainage device 300 may include the drain tray 310 and the drain pipe 320.

The drain tray 310 may be disposed at a lower side of the condensation chamber 200 inside the housing 10. The drain tray 310 may be provided to collect condensed water generated in the condensation chamber 200.

The drain tray 310 may be provided to communicate with each of the condensation chamber 200 and the catalytic filter part 410. For example, the drain tray 310 may be provided to communicate with the outlet 212 and the flow-in part 416 of the catalytic filter part 410, respectively.

The exhaust gas passed through the condensation chamber 200 may pass through the drain tray 310 and then flow to the catalytic filter part 410. In this process, moisture separated from the exhaust gas may be accommodated in the drain train 310, and the exhaust gas from which moisture has been removed may be introduced into the catalytic filter part 410.

The drain tray 310 has a drain hole 314 through which the condensed water collected from the condensation chamber 200 is drained, and a bottom surface part 313 forming a recess 312 in which the condensed water collected from the condensation chamber 200 is accommodated. The drain hole 314 may be provided to drain the condensed water accommodated in the recess 312. The drain hole 314 may be disposed adjacent to the rear side of the housing 10.

For example, the recess 312 may extend in the front-rear direction (the X direction).

For example, the drain hole 314 may be formed to pass through the bottom surface part 313.

The bottom surface part 313 may include a shape inclined downward as being directed to the drain hole 314 such that the condensed water is easily drained. For example, one side of the bottom surface part 313 in which the drain hole 314 is formed may be provided to be lower than the other side of the bottom surface part 313 in which the drain hole 314 is not formed. Thereby, a smooth gradient may be achieved. For example, the bottom surface part 313 may be provided to be inclined downward as being directed to the rear of the housing 10.

The drain tray 310 may include a plate seating part 311. The condensation chamber 200 may be seated on the plate seating part 311. For example, the plate seating part 311 may be provided to support the base plate 215 of the condensation chamber 200. The plate seating parts 311 may be provided on both sides of the recess 312 in the left-right direction (the Y direction). The plate seating parts 311 may extend in the front-rear direction (the X direction).

The drain tray 310 may include a drain port 315 extending from the drain hole 314. The drain port 315 may communicate with the drain hole 314. The drain pipe 320 may be connected to the drain port 315, and condensed water discharged from the drain hole 314 may be introduced into the drain pipe 320 through the drain port 315.

Meanwhile, the drain tray 310 may be disposed on the upper side of the base frame 11 of the housing 10. The drain tray 310 may be detachably mounted to the housing 10. The drain tray 310 may be detachably mounted to the base frame 11.

The base frame 11 may include a shape corresponding to the shape of the drain tray 310. For example, the base frame 11 may include a seating part counterpart 11a corresponding to the plate seating part 311 and a recess counterpart 11b corresponding to the recess 312. The recess counterpart 11b may be provided to be inclined downward as being directed to the rear of the housing 10.

The drain pipe 320 may be connected to the drain hole 314 of the drain tray 310. The drain pipe 320 may be coupled to the drain port 315 of the drain tray 310 and provided to communicate with the drain hole 314. The drain pipe 320 may be provided to discharge the condensed water contained in the drain tray 310 to the outside of the housing 10.

For example, the drain pipe 320 may have one end 321 connected to the drain port 315, and the other end 322 connected to a cap 17. Alternatively, the drain pipe 320 may have one end 321 connected to the drain port 315, and the other end 322 connected to a separate drain hose (not shown).

The filter device 400 may include the catalytic filter part 410 and the deodorizing filter part 420.

The catalytic filter part 410 may include the catalytic filter 411 provided to sterilize or deodorize exhaust gas through a catalytic reaction.

The catalytic filter part 410 may include a catalytic filter case 412 provided to accommodate the catalytic filter 411. The catalytic filter case 412 may form the exterior of the catalytic filter part 410.

The catalytic filter case 412 may include a case hole 412h. For example, the case hole 412h may be provided to cool the heat generated when the catalytic filter 411 is used. For example, the case hole 412h may prevent a temperature increase due to heat generation of a light emitting member 423, which will be described below. The case hole 412h may allow the heat inside the catalytic filter case 412 to escape to the outside of the catalytic filter case 412, thereby lowering the temperature of the catalytic filter case 412.

For example, the catalytic filter 411 may be provided as a photocatalytic filter. The catalytic filter 411 may include a photocatalytic filter including a base and a photocatalytic applied to the base. For example, the photocatalytic including at least one of titanium dioxide, tungsten trioxide, manganese dioxide, and zinc oxide may be applied to the base including ceramic material. However, the disclosure is not limited thereto, and the catalytic filter 411 may be provided as a photocatalytic filter of various materials.

The catalytic filter part 410 may include the light emitting member 413 for photocatalytic reaction of the catalytic filter 411. For example, the light emitting member 413 may include a substrate 413a and a light source 413b mounted on the substrate 413a to transmit light toward the catalytic filter 411. The light source 413b may be provided to emit ultraviolet rays. The light emitting member 413 may be disposed to face the catalytic filter 411.

The catalytic filter part 410 may include a catalytic filter frame 414 provided to support the catalytic filter 411. The catalytic filter frame 414 may stably fix the catalytic filter 411.

For example, the catalytic filter frame 414 may include a supporter 415 provided to support the light emitting member 413. For example, the supporter 415 may extend from the catalytic filter frame 414 and protrude toward the light emitting member 413. The supporter 415 may include a hook shape provided to be caught on the substrate 413a.

The catalytic filter part 410 may include the flow-in part 416 through which the exhaust gas passed through the condensation chamber 200 is introduced, and a flow-out part 417 through which the exhaust gas passed through the deodorizing filter 411 flows out.

For example, the flow-in part 416 may be formed at a lower portion of the catalytic filter case 412, and the flow-out part 417 may be formed at an upper portion of the catalytic filter case 412 to correspond to the deodorizing filter part 420. The exhaust gas passed through the condensation chamber 200 may flow from the lower side to the upper side of the catalytic filter 411.

For example, the flow-in part 416 of the catalytic filter part 410 may be provided to communicate with the communication part 216 of the condensation chamber 200. For example, the flow-in part 416 of the catalytic filter part 410 may be formed by mounting the catalytic filter case 412, which has an open bottom, on the filter mounting part 217 of the condensation chamber 200. For example, the flow-in part 416 of the catalytic filter part 410 may be formed by the communication part 216 of the condensation chamber 200.

The catalytic filter part 410 may include the coupling part 418 coupled to the coupling part 218 of the condensation chamber 200. For example, the coupling part 418 of the catalytic filter part 410 may be formed along the circumference of the catalytic filter case 412. For example, the coupling part 418 of the catalytic filter part 410 may be provided in plural, and the coupling part 218 of the condensation chamber 200 may be provided in plural to correspond to the plurality of coupling parts 418 of the catalytic filter part 410.

The deodorizing filter part 420 may be disposed on the upper side of the catalytic filter part 410. The exhaust gas flowing upward may pass through the catalytic filter part 410 and then flow into the deodorizing filter part 420.

The deodorizing filter part 420 may include the deodorizing filter 421 provided to remove the odor of the exhaust gas. The deodorizing filter 421 may adsorb odor particles in the exhaust gas. For example, the deodorizing filter 421 may include an activated carbon filter and a ceramic filter.

The deodorizing filter part 420 may include a deodorizing filter case 422 provided to accommodate the deodorizing filter 421. The deodorizing filter case 421 may form the external appearance of the deodorizing filter part 420.

The deodorizing filter part 420 may include a deodorizing filter frame 423 provided to support the deodorizing filter 421. The deodorizing filter frame 423 may prevent the deodorizing filter 421 from being separated downward toward the catalytic filter part 410. The deodorizing filter frame 423 may stably fix the deodorizing filter 421.

The deodorizing filter part 420 may include a flow-in part 424 through which the exhaust gas passed through the catalytic filter 411 flows in, and a flow-out part 425 through which the exhaust gas passed through the deodorizing filter 421 flows out.

The flow-out part 425 of the deodorizing filter part 420 may be provided to correspond to the exhaust hole 14 formed in the rear side of the housing 10. The flow-out part 425 may be provided to communicate with the outside of the housing 10. The filtered exhaust gas may be discharged to the outside of the housing 10 through the flow-out part 425.

For example, the flow-in part 424 may be formed at a lower portion of the deodorizing filter case 422, and the flow-out part 425 may be formed at an upper portion of the deodorizing filter case 422. The exhaust gas passed through the catalytic filter 411 may flow from the lower side to the upper side of the deodorizing filter 421.

Figure 15:
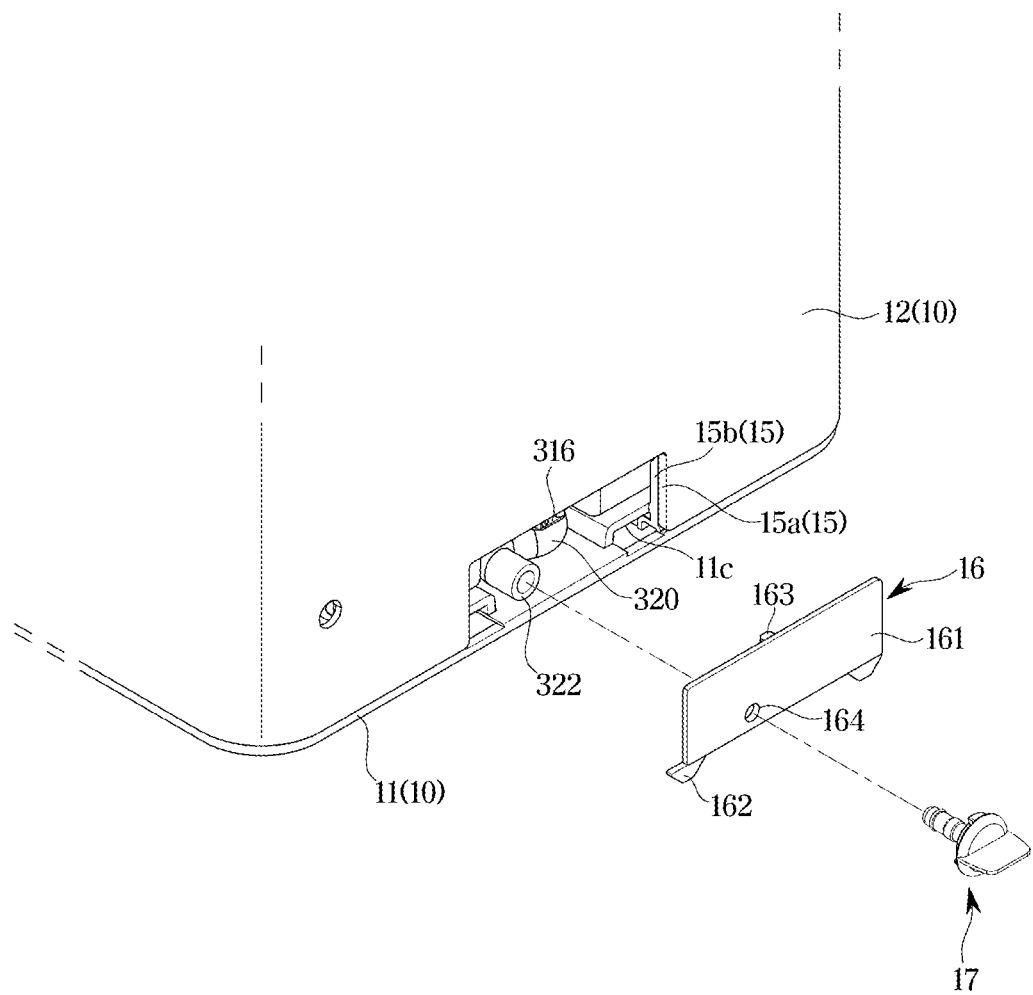
FIG. 15 is an exploded view illustrating a rear portion of a food waste disposer according to an embodiment.
Figure 16:
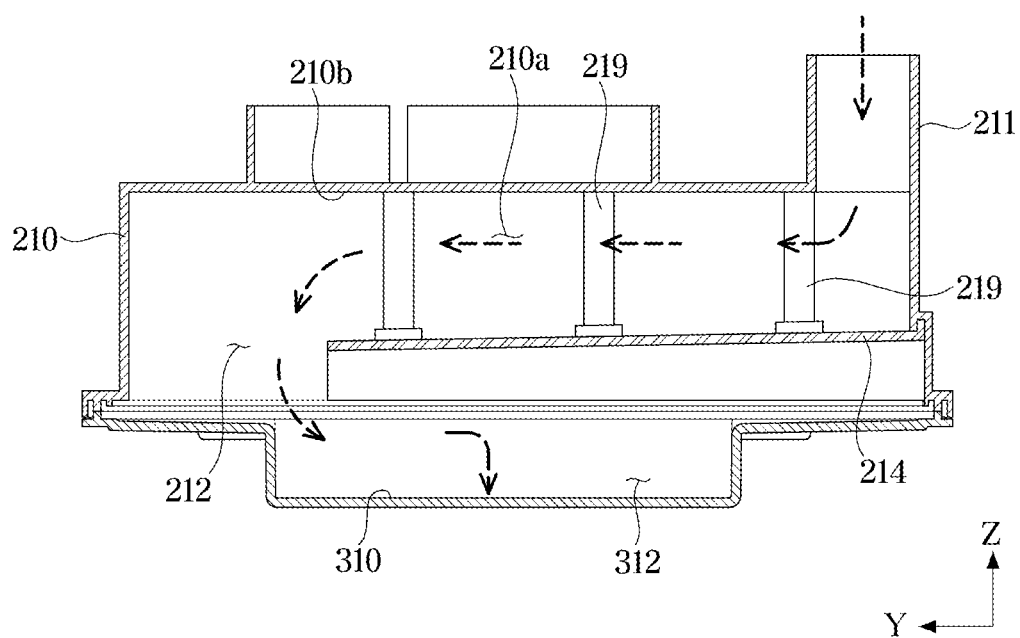
FIG. 16 is a cross-sectional view of a condensation chamber and a drain tray of a food waste disposer according to an embodiment.

FIG. 15 is an exploded view illustrating a rear portion of a food waste disposer according to an embodiment.

Referring to FIG. 15, the housing 10 may include an opening 15 provided at a rear side thereof. For example, the base frame 11 may include an opening 15b, and the side frame 12 may include an opening 15a. The opening 15b of the base frame 11 may be provided to correspond to the opening 15a of the side frame 12. The opening 15b of the base frame 11 may have a size and shape corresponding to those of and the opening 15a of the side frame 12.

The opening 15b of the base frame 11 and the opening 15a of the side frame 12 may form a service opening 15 that allows the inside of the housing 10 to be assessable from the outside of the housing 10. Hereinafter, both the opening 15b of the base frame 110 and the opening 15a of the side frame 12 may be referred to as a service opening 15.

The service opening 15 may be provided to allow access to the drain tray 310 disposed inside the housing 10 from the outside of the housing 10. The service opening 15 may be formed in the rear of the housing 10 corresponding to the drain tray 310.

The housing 10 may include a service cover 16 provided to cover the service opening 15. The service cover 16 may be provided at the rear of the housing 10. The service cover 16 may be detachably mounted to the rear of the housing 10.

The service cover 16 may include a cover body 161. The cover body 161 may have a shape and size corresponding to those of the service opening 15.

The service cover 16 may include a locking protrusion 162 provided to be caught on a locking holder 11c of the housing 10.

The service cover 16 may include a fixing protrusion 163 protruding from the cover body 161 toward the service opening 15. The fixing protrusion 163 may be provided to be fixed to a fixing holder 316 provided inside the housing 10. For example, the fixing holder 316 may be formed at the rear of the drain tray 310.

For example, the user may couple the fixing protrusion 163 of the service cover 16 to the fixing holder 316 in a state in which the locking protrusion 162 of the service cover 16 is inserted into the locking holder 11c.

The service cover 16 may further include a hole 164 into which the cap 17 is inserted. The cap 17 may pass through the hole 164 to be coupled to the other end 322 of the drain pipe 320. For example, the user may separate the cap 17 from the drain pipe 320 and connect a separate drain hose to the other end 322 of the drain pipe 320.

FIGS. 16 to 23 are cross-sectional views illustrating a condensation chamber and a drain tray of a food waste disposer according to various embodiments.

The condensation chamber 200 may be provided to exchange heat with the exhaust gas introduced from the exhaust duct 110. For example, the exhaust gas may be caused to lose heat by the condensation chamber 200 while flowing in the first direction (the Y direction) in the condensation passage 210a of the condensation chamber 200. That is, the exhaust gas may be cooled and condensed while flowing through the condensation passage 210a.

FIGS. 17 to 23, the condensation chamber 200 may include a baffle plate 220 provided in the condensation passage 210a to obstruct the flow of exhaust gas. The baffle plate 200 may obstruct the flow of the exhaust gas flowing into the chamber body 210 to secure a predetermined time for the exhaust gas to stay in the condensation passage 210a. Accordingly, the efficiency of heat exchange of the exhaust gas with the condensing chamber 200 may be increased, and the exhaust gas may be cooled more effectively.

Figure 17:
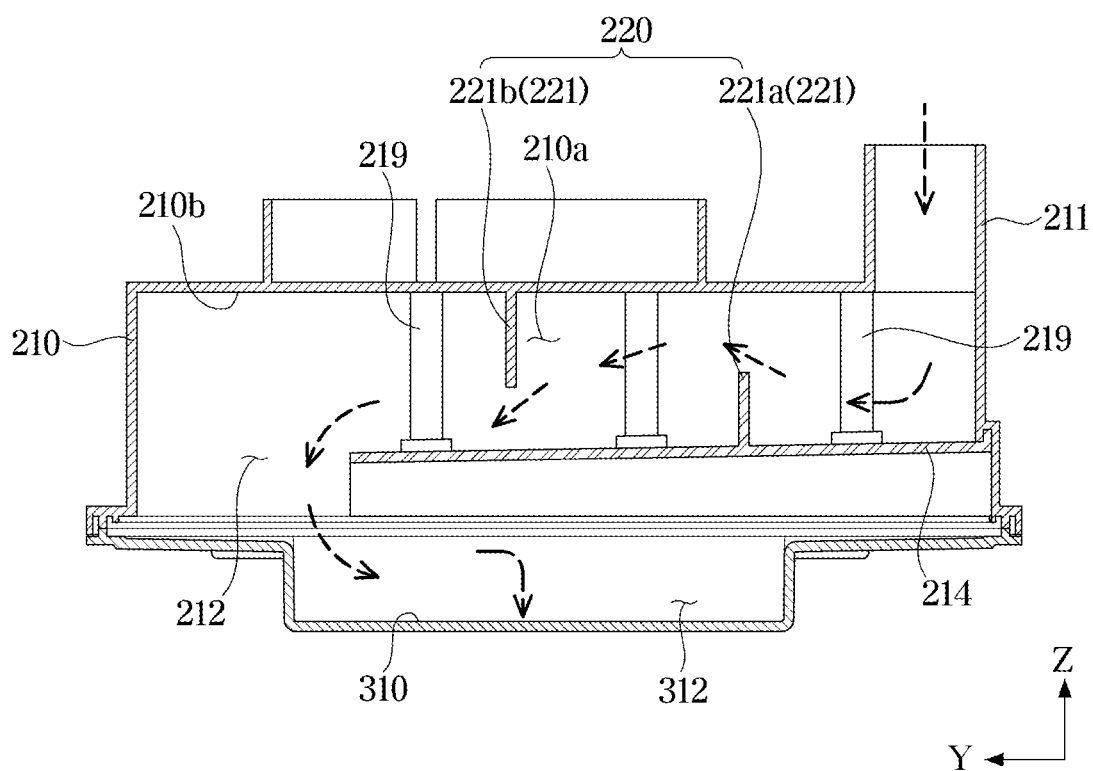
FIG. 17 is a cross-sectional view of a condensation chamber and a drain tray of a food waste disposer according to an embodiment.

Referring to FIG. 17, the baffle plate 220 may include a first plate 221. The first plate 221 may extend in a second direction (the Z direction) crossing the first direction (the Y direction). The first plate 221 may extend in the vertical direction.

The first plate 221 may be provided to block the condensation passage 210a. The first plate 221 may be provided to partition a portion of the condensation passage 210a.

The first plate 221, i.e., 221b may extend downward from the upper inner surface 210b of the chamber body 210. The first plate 221, i.e., 221a may extend upward from the partition plate 214.

The first plate 221 may be integrally formed with the chamber body 210 or the partition plate 214. However, the disclosure is not limited thereto, and the first plate 221 may be provided separately from each of the chamber body 210 and the partition plate 214, and coupled to the inside of the chamber body 210.

For example, the first plate 221 may be provided in plural. For example, the first plate 221 may include a first-A plate 221a and a first-B plate 221b. The first-A plate 221a may extend upward from the partition plate 214, and the first-Bb plate 221b may extend downward from the upper inner surface 210b of the chamber body 210. The first-A plate 221a and the first-B plate 221b may be alternately disposed, to form the condensation passage 210a in a zigzag shape. The first-A plate 221a and the first-B plate 221b may cause the condensing passage 210a to be meandering.

Meanwhile, in the drawings, the first-A plate 221a is disposed adjacent to the inlet 211 and the first-B plate 221b is disposed farther from the inlet 211 than the first-A plate 221a is, but the disclosure is not limited thereto. For example, the first-B plate 221b may be disposed closer to the inlet 211 than the first-A plate 221a is.

In FIG. 17, the first plate 221 is illustrated as two first plates, but the disclosure is not limited thereto, and the first plate 221 may be provided as a single first plate, or as three or more first plates.

In addition, although each of the first-A plate 221a and the first-B plate 221b is illustrated as one unit thereof, the disclosure is not limited thereto. The first plate 221 may include at least one of the first-A plate 221a and the first-B plate 221b. The first plate 221 may be provided as a single first-A plate 221a. The first plate 221 may be provided as a single first-B plate 221b. The first-A plate 221a may be provided in one unit thereof and the first-B plate 221b may be provided in two or more units thereof. The first-A plate 221a may be provided in two or more units thereof and the first-B plate 221b may be provided in one unit thereof. Each of the first-A plate 221a and the first-B plate 221b may be provided in two or more units thereof.

Figure 18:
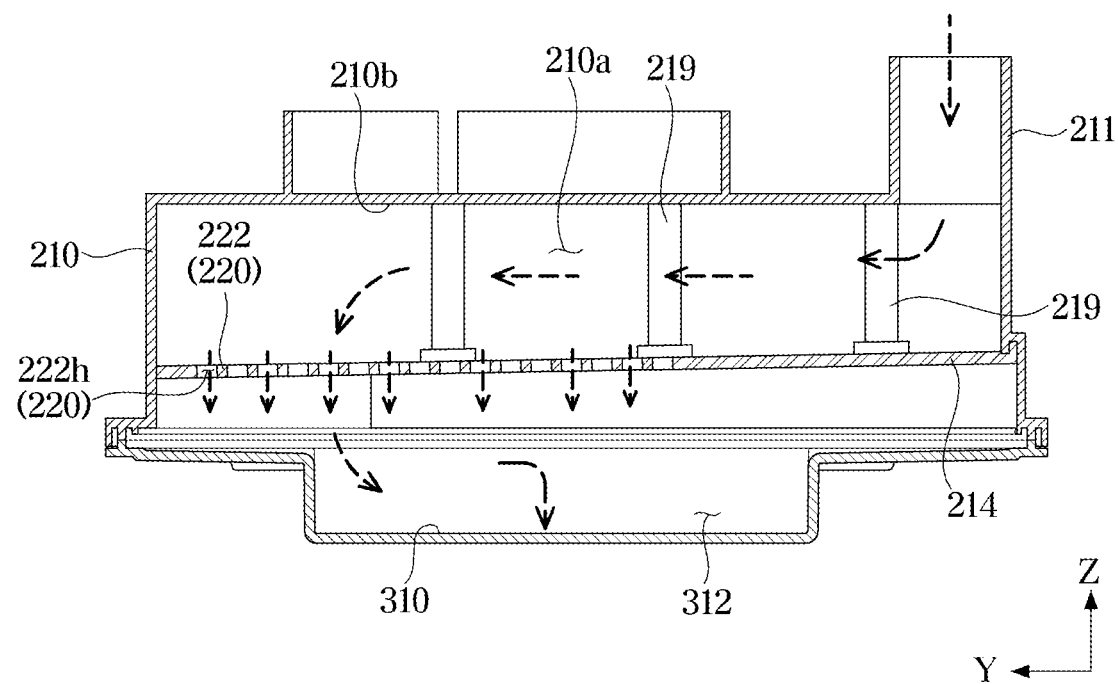
FIG. 18 is a cross-sectional view of a condensation chamber and a drain tray of a food waste disposer according to an embodiment.

Referring to FIG. 18, the baffle plate 220 may include a second plate 222. The second plate 222 may extend along the condensation passage 210a. The second plate 222 may extend in the first direction (the Y direction).

For example, the second plate 222 may be provided on substantially the same line as the partition plate 214. The second plate 222 may be arranged in a line with the partition plate 214 in the first direction (the Y direction). The second plate 222 may be provided to divide the condensation passage 210a from the drain tray 310.

For example, the second plate 222 may be disposed on the outlet 212. Accordingly, the exhaust gas passed through the condensation passage 210a may be discharged through a through hole 222h of the second plate 222, which will be described below. That is, the through hole 222h of the second plate 222 may be provided as the outlet 212.

The second plate 222 may be integrally formed with the chamber body 210 or the partition plate 214. However, the disclosure is not limited thereto, and the second plate 222 may be provided separately from each of the chamber body 210 and the partition plate 214, and coupled to the interior of the chamber body 210.

The second plate 222 may have a shape inclined downward in a direction away from the inlet 211. The second plate 222 may have a shape inclined downward in a direction approaching the outlet 212. Accordingly, the exhaust gas may smoothly flow on the condensation passage 210a.

The second plate 222 may include a plurality of through holes 222h. When the baffle plate 220 obstructs the flow of the exhaust gas, the condensation effect may be improved, but the exhaust gas may have a flow loss. Since the second plate 222 includes the plurality of through-holes 222h, the flow loss of the exhaust gas may be reduced wile securing the effect of condensing the exhaust gas. As the exhaust gas passes through the plurality of through-holes 222h, the flow rate may be increased. Accordingly, the total flow rate of the exhaust gas passing through the condensation chamber 220 may not decrease.

The plurality of through-holes 222h may be provided to be arranged along the condensation passage 210a.

The exhaust gas, while flowing in the first direction (the Y direction) along the condensation passage 210a, passing through the through holes 222h of the second plate 222, flows into the drain tray 310.

Figure 19:
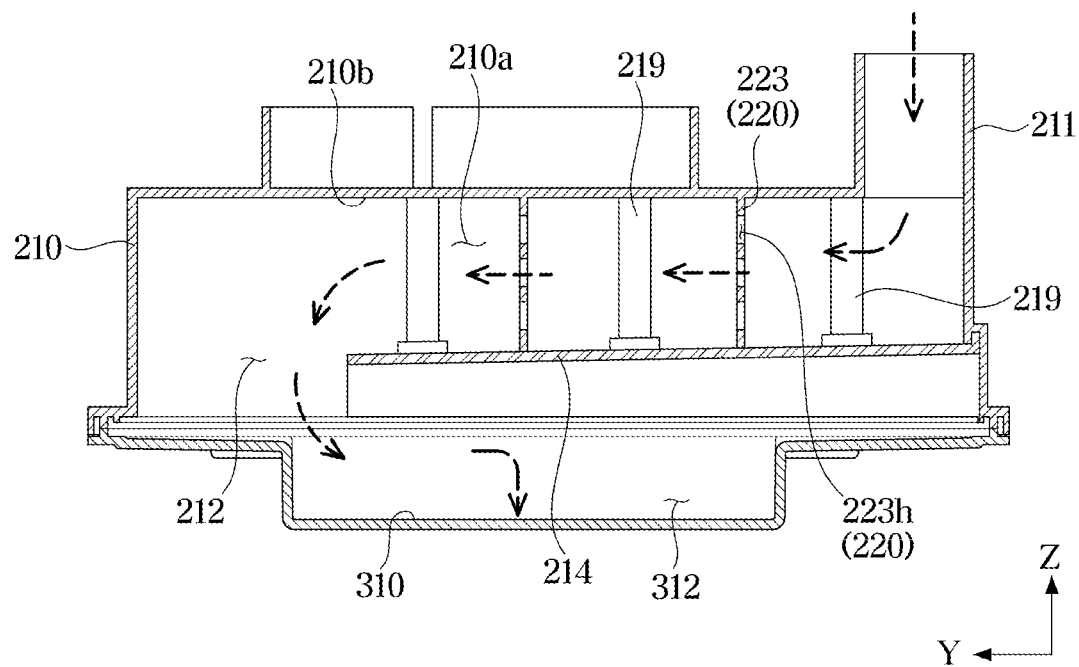
FIG. 19 is a cross-sectional view of a condensation chamber and a drain tray of a food waste disposer according to an embodiment.

Referring to FIG. 19, the baffle plate 220 may include a third plate 223. The third plate 223 may extend in the second direction (the Z direction) crossing the first direction (the Y direction). The third plate 223 may extend in the vertical direction.

The third plate 223 may be provided to block the condensation passage 210a. The third plate 223 may be provided to partition at least a portion of the condensation passage 210a. The third plate 223 may be provided to extend in the vertical direction between the upper inner surface 210b of the chamber body 210 and the partition plate 214.

The third plate 223 may be integrally formed with the chamber body 210 or the partition plate 214. However, the disclosure is not limited thereto, and the third plate 223 may be provided separately from each of the chamber body 210 and the partition plate 214, and coupled to the interior of the chamber body 210.

For example, the third plate 223 may be provided in plural. The plurality of third plates 223 may be arranged to be spaced apart from each other in the first direction (the Y direction).

In FIG. 19, the third plate 223 is illustrated as two third plates 223, but the disclosure is not limited thereto. The third plate 223 may be provided as a single third plate 223 or three or more third plates 223.

The third plate 223 may include a plurality of through holes 223h. When the baffle plate 220 obstructs the flow of the exhaust gas, the condensation effect may be improved, but the exhaust gas may have a flow loss. Since the third plate 223 includes the plurality of through holes 223h, the flow loss of the exhaust gas may be reduced while securing the effect of condensing the exhaust gas. As the exhaust gas passes through the plurality of through holes 223h, the flow rate of the exhaust gas may be increased. Accordingly, the total flow rate of the exhaust gas passing through the condensation chamber 220 may not decrease.

The exhaust gas, while flowing in the first direction along the condensation passage 210a, passing through the through holes 223h of the third plate 222, flow into the drain tray 310.

Figure 20:
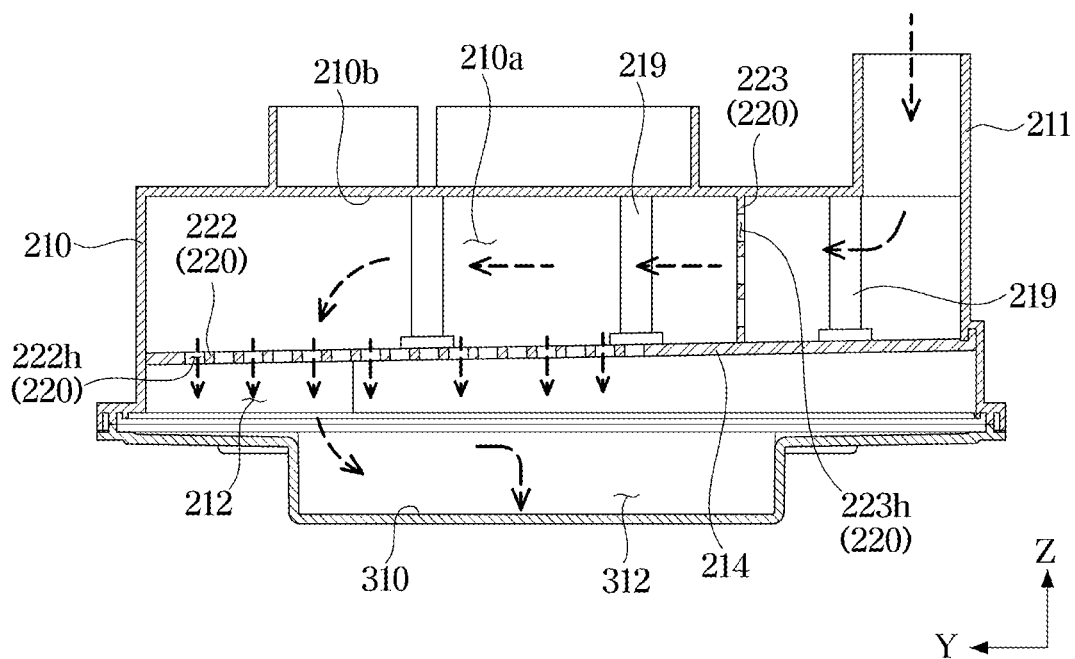
FIG. 20 is a cross-sectional view of a condensation chamber and a drain tray of a food waste disposer according to an embodiment.

Referring to FIG. 20, the baffle plate 220 may include the second plate 222 and the third plate 223. The same components may be assigned the same reference numerals, and the same descriptions may be omitted.

For example, the second plate 222 may be disposed in the horizontal direction, and the third plate 223 may be disposed in the vertical direction. The second plate 222 may be arranged in a line with the partition plate 214 in the first direction (the Y direction). The second plate 222 may be provided to divide the condensation passage 210a from the drain tray 310. The third plate 223 may be provided to block the condensation passage 210a.

The exhaust gas may pass through the second plate 222 and the third plate 223 and flow into the drain tray 310. The exhaust gas may be introduced into the drain tray 310 by passing through the plurality of through holes 222h of the second plate 222 and the plurality of through holes 223h of the third plate 223. As the exhaust gas passes through the plurality of through holes 222h and 223h, the flow rate of the exhaust gas may be increased.

In FIG. 20, each of the second plate 222 and the third plate 223 is illustrated as one unit thereof, but the disclosure is not limited thereto. The second plate 222 may be provided as one unit thereof, and the third plate 223 may be provided in two or more units thereof. The second plate 222 may be provided in two or more units thereof, and the third plate 223 may be provided in one unit thereof. Each of the second plate 222 and the third plate 223 may be provided in two or more units thereof.

For example, when the second plate 222 is provided in plural, each of the plurality of second plates 222 may be arranged in a line along the first direction (the Y direction).

For example, when the third plates 223 is provided in plural, the plurality of third plates 223 may be disposed to be spaced apart from each other in the first direction (the Y direction).

Figure 21:
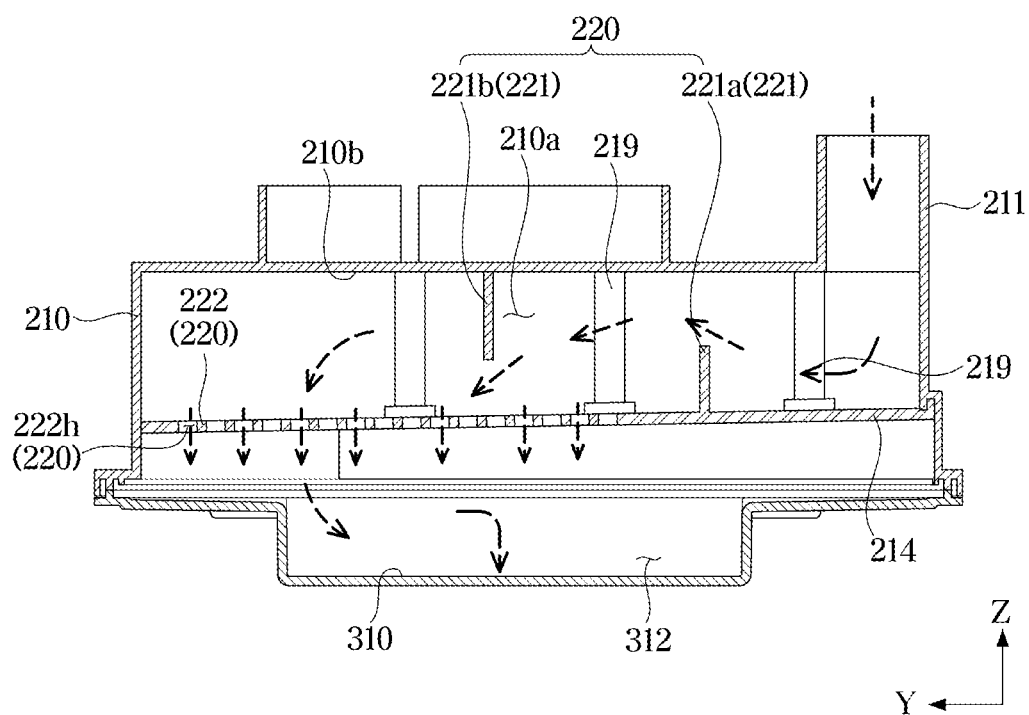
FIG. 21 is a cross-sectional view of a condensation chamber and a drain tray of a food waste disposer according to an embodiment.

Referring to FIG. 21, the baffle plate 220 may include the first plate 221 and the second plate 222. The same components may be assigned the same reference numerals, and the same descriptions may be omitted.

For example, the first plate 221 may be disposed in the vertical direction, and the second plate 222 may be disposed in the horizontal direction. The first plate 221 may be provided to partition a portion of the condensation passage 210a. The second plate 222 may be arranged in a line with the partition plate 214 in the first direction (the Y direction). The second plate 222 may be provided to divide the condensation passage 210a from the drain tray 310.

The exhaust gas may pass through the plurality of through holes 222h of the second plate 222 and flow into the drain tray 310. As the exhaust gas passes through the plurality of through-holes 222h, the flow rate of the exhaust gas may be increased.

In FIG. 21, the first plate 221 is illustrated as two units thereof and the second plate 222 is illustrated as one unit thereof, but the disclosure is not limited thereto. The first plate 221 may be provided in one unit or two or more units thereof. The second plates 222 may be provided in two or more units thereof.

The first plate 221 may allow the exhaust gas to meander along the condensation passage 210a.

Figure 22:
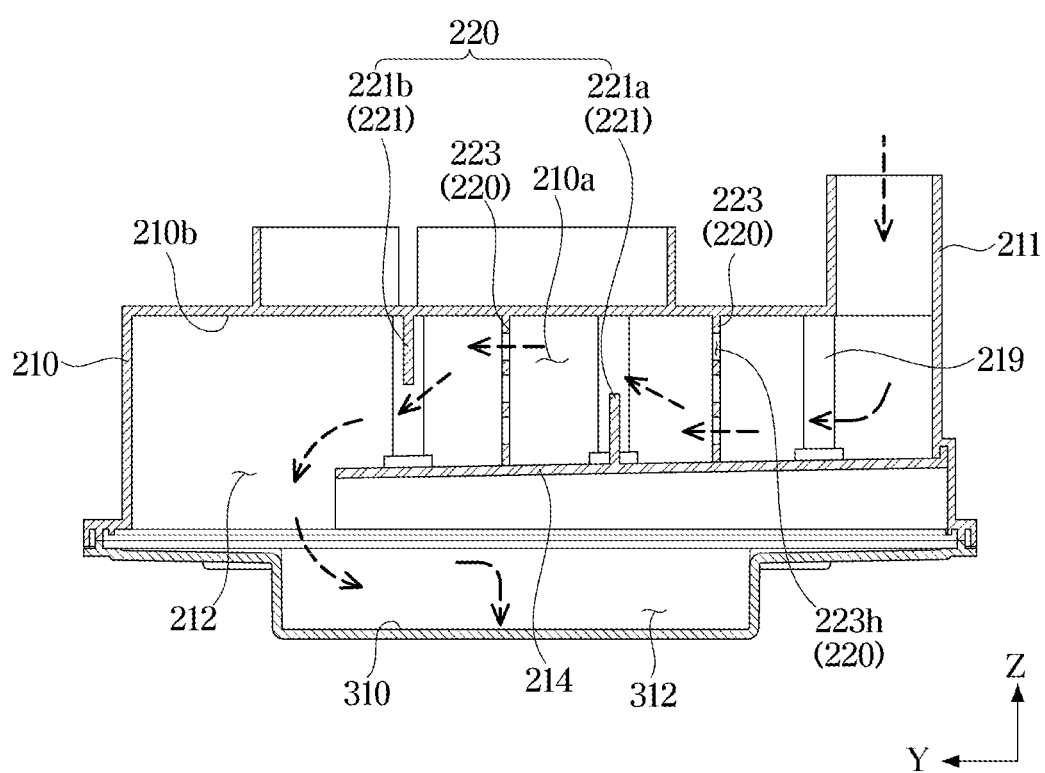
FIG. 22 is a cross-sectional view of a condensation chamber and a drain tray of a food waste disposer according to an embodiment.

Referring to FIG. 22, the baffle plate 220 may include the first plate 221 and the third plate 223. The same components may be assigned the same reference numerals, and the same descriptions may be omitted.

For example, the first plate 221 and the third plate 223 may be disposed in the vertical direction. The first plate 221 may be provided to partition a portion of the condensation passage 210a. The third plate 223 may be provided to partition at least a portion of the condensation passage 210a.

The first plate 221, i.e., 221b may extend downward from the upper inner surface 210b of the chamber body 210. The first plate 221, i.e., 221a may extend upward from the partition plate 214. The third plate 223 may be provided to extend in the vertical direction between the upper inner surface 210b of the chamber body 210 of the condensation passage 210a and the partition plate 214.

The first plate 221 and the third plate 223 may be alternately disposed. For example, referring to FIG. 22, based on the flow direction of the exhaust gas, the third plate 223, the first-A plate 221a, the third plate 223, and the first-B plate 221b may be disposed in the order. However, the disclosure is not limited thereto, and the reverse order may also possible. In addition, the first plate 221 may be disposed on an upstream side of the third plate 223.

The first plate 221 may allow the exhaust gas to meander along the condensation passage 210a.

As the exhaust gas passes through the plurality of through-holes 223h, the flow rate of the exhaust gas may be increased.

Figure 23:
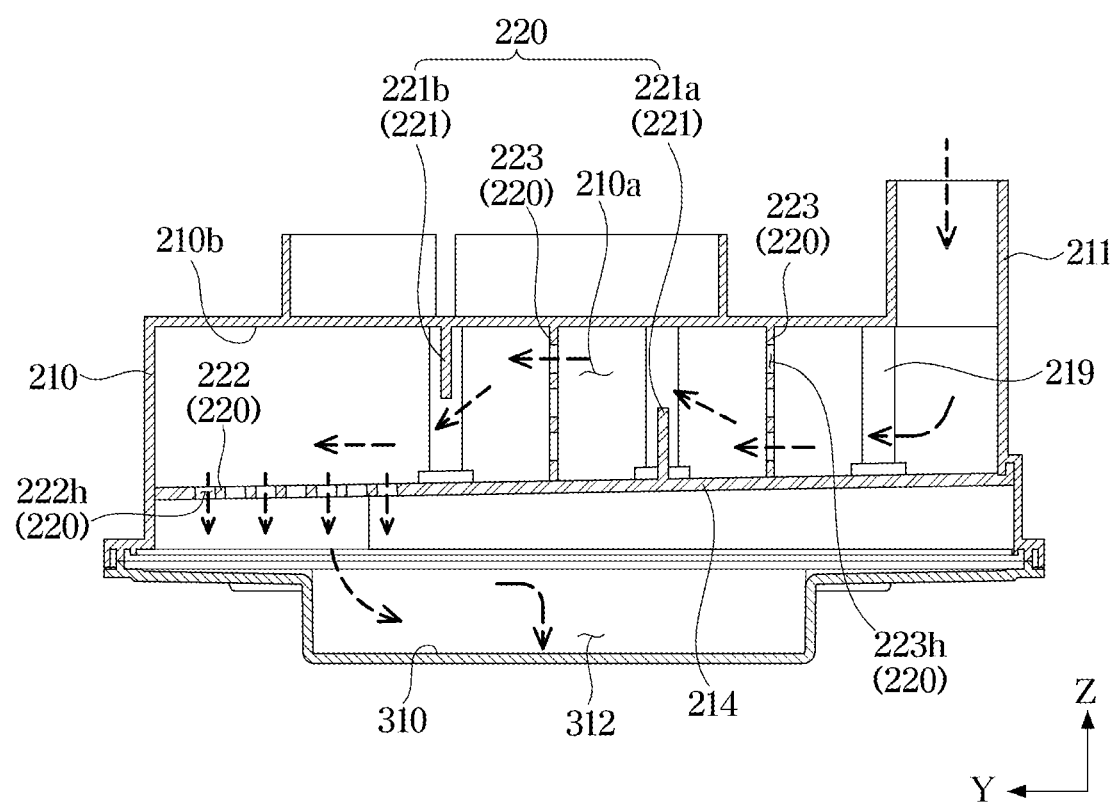
FIG. 23 is a cross-sectional view of a condensation chamber and a drain tray of a food waste disposer according to an embodiment.

Referring to FIG. 23, the baffle plate 220 may include the first plate 221, the second plate 222, and the third plate 223. The same components may be assigned the same reference numerals, and the same descriptions may be omitted.

For example, the first plate 221 and the third plate 223 may be disposed in the vertical direction. The first plate 221 may be provided to partition a portion of the condensation passage 210a. The third plate 223 may be provided to partition at least a portion of the condensation passage 210a. The second plate 222 may be disposed in the horizontal direction.

The first plate 221 and the third plate 223 may be alternately disposed.

The first plate 221 may allow the exhaust gas to meander along the condensation passage 210a.

The second plate 222 may be provided to divide the condensation passage 210a from the drain tray 310.

The exhaust gas may pass through the plurality of through holes 222h and 223h and flow into the drain tray 310. As the exhaust gas passes through the plurality of through holes 222h and 223h, the flow rate of the exhaust gas may be increased.

As is apparent from the above, according to one aspect of the disclosure, the food waste disposer can be provided with a longer filter replacement cycle.

According to one aspect of the disclosure, the food waste disposer can improve the performance of the filter device by removing moisture from the exhaust gas before the exhaust gas flows into the filter device.

According to one aspect of the disclosure, the food waste disposer can have an improved structure of reducing a flow loss of exhaust gas.

According to one aspect of the disclosure, the food waste disposer can easily drain the condensed water.

Although certain illustrative embodiments and implementations have been described herein, other embodiments and modifications will be apparent from this description. Accordingly, the inventive concepts are not limited to such embodiments, but rather to the broader scope of the appended claims and various obvious modifications and equivalent arrangements as would be apparent to a person of ordinary skill in the art.

What is claimed is:

1. A food waste disposer comprising:
a housing;
a container disposed inside the housing to accommodate food waste;
an exhaust duct communicating with the container to allow exhaust gas generated in the container to flow therein;
a filter device including:
a catalytic filter part configured to filter the exhaust gas passed through the exhaust duct; and
a deodorizing filter part configured to filter the exhaust gas passed through the catalytic filter part and communicating with an outside of the housing; and
a condensation chamber configured to remove moisture in the exhaust gas flowing from the exhaust duct into the catalytic filter part of the filter device, the condensation chamber including:
a condensation passage formed by extending in one direction to allow the exhaust gas to flow therethrough; and
a baffle plate placed in the condensation passage to change a flow of the exhaust gas, the baffle plate including a plurality of through holes which the exhaust gas passes through.

2. The food waste disposer of claim 1, further comprising a drain tray disposed at a lower side of the condensation chamber in the housing to collect condensed water generated in the condensation chamber.

3. The food waste disposer of claim 2, wherein the baffle plate extends along the condensation passage, and the plurality of through holes are arranged along the condensation passage.

4. The food waste disposer of claim 2, wherein the condensation chamber includes:
a chamber body forming the condensation passage therein;
an inlet provided at one side of the chamber body, and communicating with the exhaust duct to introduce the exhaust gas from the exhaust duct into the condensation passage; and
an outlet provided at an other side of the chamber body, and communicating with the drain tray to discharge the exhaust gas passed through the condensation passage to the drain tray.

5. The food waste disposer of claim 2, wherein the one direction is a first direction, and
the baffle plate is disposed in a second direction crossing the first direction to block the condensation passage.

6. The food waste disposer of claim 5, wherein the baffle plate includes a plurality of baffle plates, and the plurality of baffle plates are spaced apart from each other.

7. The food waste disposer of claim 4, wherein the condensation chamber further includes a reinforcer provided on an inner wall of the chamber body to reinforce a rigidity of the chamber body.

8. The food waste disposer of claim 7, wherein the inlet is formed in an upper portion of the chamber body, and the outlet is formed in a lower portion of the chamber body.

9. The food waste disposer of claim 2, wherein the drain tray communicates with each of the condensation chamber and the catalytic filter part, and
the exhaust gas passed through the condensation chamber flows to the catalytic filter part through the drain tray.

10. The food waste disposer of claim 2, wherein the drain tray further includes:
a drain hole through which the condensed water collected from the condensation chamber is drained; and
a bottom surface part configured to form a recess for accommodating the condensed water collected from the condensation chamber, and provided to be inclined downward toward the drain hole.

11. The food waste disposer of claim 2, wherein the drain tray comprises a drain hole formed therein, and the food waste disposer further comprises a drain pipe connected to the drain hole to discharge the condensed water drained from the drain hole to the outside of the housing.

12. The food waste disposer of claim 1, further comprising an exhaust fan to communicate with the exhaust duct to form an intake airflow from the container toward the filter device.

13. The food waste disposer of claim 1, wherein the catalytic filter part includes:
  a filter case to accommodate a catalytic filter therein; and
  a light emitter provided in the filter case to face the catalytic filter and to irradiate the catalytic filter when the catalytic filter is in accommodated in the filter case.

14. The food waste disposer of claim 13, wherein the filter case includes a case hole formed therein to lower a temperature of the filter case by releasing heat generated by the light emitter through the case hole.

\* \* \* \* \*